(12) United States Patent
Kudo et al.

(10) Patent No.: US 12,467,228 B2
(45) Date of Patent: Nov. 11, 2025

(54) WORKING MACHINE

(71) Applicant: KUBOTA CORPORATION, Osaka (JP)

(72) Inventors: Arisa Kudo, Osaka (JP); Daisuke Yoshida, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 18/960,172

(22) Filed: Nov. 26, 2024

(65) Prior Publication Data

US 2025/0179768 A1  Jun. 5, 2025

(30) Foreign Application Priority Data

Dec. 1, 2023  (JP) ................................. 2023-203940
Dec. 1, 2023  (JP) ................................. 2023-203941

(51) Int. Cl.
| | | |
|---|---|---|
| *E02F 9/08* | (2006.01) | |
| *B60K 11/04* | (2006.01) | |
| *F01P 11/10* | (2006.01) | |
| *F01P 1/00* | (2006.01) | |

(52) U.S. Cl.
CPC ............ *E02F 9/0866* (2013.01); *B60K 11/04* (2013.01); *E02F 9/0891* (2013.01); *F01P 11/10* (2013.01); *B60Y 2200/412* (2013.01); *F01P 2001/005* (2013.01)

(58) Field of Classification Search
CPC ......... E02F 9/08; E02F 9/0858; E02F 9/0866; E02F 9/0891; B60K 11/00; B60K 11/02; B60K 11/04; B60K 11/06; B60K 11/08; F01P 11/10; F01P 11/08; F01P 5/06;
(Continued)

(56) References Cited

U.S. PATENT DOCUMENTS 3,788,419 A * 1/1974 Drone .................... B60K 11/04
                                                                180/68.4
5,709,175 A * 1/1998 Carroll .................... F02B 77/13
                                                                123/41.66
(Continued)

FOREIGN PATENT DOCUMENTS

JP     2001227343 A  *  8/2001
JP     2005-280477 A     10/2005
(Continued)

OTHER PUBLICATIONS

Extended European Search Report issued for European family member Application No. 24216023.2 dated May 21, 2025.

*Primary Examiner* — Keith J Frisby
(74) *Attorney, Agent, or Firm* — GREENBLUM & BERNSTEIN, P.L.C.

(57) ABSTRACT

A working machine includes a machine body, a prime mover on the machine body, at least one cooling device provided at one side of the prime mover, a shroud to guide a cooling air flow for cooling the at least one cooling device, and a partition plate to separate a prime mover room to house the prime mover from an area where the at least one cooling device is provided. The partition plate includes an opening to allow the shroud to extend therethrough and a mounting portion at which the shroud, which extends through the opening, is attached to the partition plate.

19 Claims, 39 Drawing Sheets

(58) Field of Classification Search
CPC .......... F01P 1/00; F01P 1/06; F01P 2001/005; F01P 3/12; B60Y 2200/412; B60Y 2200/41
USPC .......... 180/68.1, 68.2, 89.1, 68.4; 123/41.31, 123/41.33, 41.49, 41.56, 41.63, 41.65, 123/41.66; 296/24.41
See application file for complete search history.

(56) References Cited

U.S. PATENT DOCUMENTS

| | | | |
|---|---|---|---|
| 6,220,207 B1 * | 4/2001 | Kawasaki | F02B 63/06 123/41.11 |
| 2012/0234513 A1 * | 9/2012 | Watanabe | B60K 11/08 165/41 |
| 2014/0026833 A1 * | 1/2014 | Jensen | F01P 5/06 29/889 |
| 2015/0204051 A1 * | 7/2015 | Noda | E02F 9/00 180/89.1 |
| 2021/0114451 A1 | 4/2021 | Yamamoto et al. | |

FOREIGN PATENT DOCUMENTS

| | | | | |
|---|---|---|---|---|
| JP | 2015071880 A | * | 4/2015 | |
| JP | 2020-006941 A | | 1/2020 | |
| WO | WO-9714874 A1 | * | 4/1997 | ............. B60K 11/04 |

* cited by examiner

WORKING MACHINE

CROSS REFERENCE TO RELATED APPLICATIONS

This application claims the benefit of priority to Japanese Patent Application No. 2023-203940 filed on Dec. 1, 2023, and to Japanese Patent Application No. 2023-203941 filed on Dec. 1, 2023. The entire contents of this application are hereby incorporated herein by reference.

BACKGROUND OF THE INVENTION

1. Field of the Invention

The present invention relates to working machines.

2. Description of the Related Art

A working machine disclosed in Japanese Unexamined Patent Application Publication No. 2020-6941 has been known.

In the working machine disclosed in Japanese Unexamined Patent Application Publication No. 2020-6941, cooling devices including a radiator and an oil cooler are arranged beside a prime mover mounted on a machine body. A shroud to guide a cooling air flow for cooling the cooling devices is provided between the prime mover and the cooling devices.

SUMMARY OF THE INVENTION

The working machine disclosed in Japanese Unexamined Patent Application Publication No. 2020-6941 has a space left around the shroud.

Example embodiments of the present invention provide working machines each of which achieves a reduction in space left around a shroud.

A working machine according to an aspect of an example embodiment of the present invention includes a machine body, a prime mover on the machine body, at least one cooling device provided at one side of the prime mover, a shroud to guide a cooling air flow for cooling the at least one cooling device, and a partition plate to separate a prime mover room to house the prime mover from an area where the at least one cooling device is provided, wherein the partition plate includes an opening to allow the shroud to extend therethrough and a mounting portion at which the shroud, which extends through the opening, is attached to the partition plate.

The working machine may further include a base plate to define a bottom portion of the machine body, a hood to define the prime mover room, and a support frame to support the hood. The partition plate may include a main plate portion including the opening and attached to the support frame and a lower wall portion extending horizontally from a lower edge of the main plate portion and attached to the base plate.

The support frame may include a structure provided between the prime mover and the partition plate. The structure may include a front structure portion, a rear structure portion provided rearward of and apart from the front structure portion, and an upper structure portion coupling an upper portion of the front structure portion and an upper portion of the rear structure portion. The partition plate may be sized to cover a space between the base plate and the upper structure portion and extend from the front structure portion to the rear structure portion.

The opening may be defined to allow the shroud to extend therethrough from the area where the at least one cooling device is provided to the prime mover room. The mounting portion may be configured to allow the shroud, which extends through the opening from the area where the at least one cooling device is provided to the prime mover room, to be attached to the partition plate from the area where the at least one cooling device is provided.

The at least one cooling device may be attached, from the area where the at least one cooling device is provided, to the partition plate with the shroud attached to the partition plate.

The working machine may further include a lifting lug located on at least a portion of an assembly obtained by attaching the shroud and the at least one cooling device to the partition plate, the lifting lug being configured to be used to lift the assembly as a single unit.

The shroud may include a guard portion to surround a cooling fan to generate the cooling air flow, an intake portion provided at a distance from the guard portion to allow the cooling air flow to enter the shroud therethrough, and an air guide portion to guide the cooling air flow from the intake portion to the guard portion. The shroud may be attached to the partition plate such that the guard portion and the air guide portion are inserted through the opening from an opposite side of the partition plate from the prime mover.

The mounting portion may be provided at a portion around the opening. The shroud may include a mount wall portion projecting from the intake portion and extending along an edge of the opening. The mount wall portion may be in contact with the portion around the opening of the partition plate on the opposite side of the partition plate from the prime mover and is attached to the mounting portion on the opposite side.

The at least one cooling device may include a plurality of cooling devices. The plurality of cooling devices may be attached to the partition plate.

The working machine may further include a routed member routed through the partition plate. The partition plate may include a hole to allow the routed member to extend therethrough and a closing structure to close the hole with the routed member extending through the hole. The closing structure may include a plurality of sealing members in tight contact with each other to seal the hole.

The plurality of sealing members may be in tight contact with each other in a direction along a plate surface of the partition plate.

The working machine may further include a cooling fan provided at one side of the prime mover to generate the cooling air flow, and a fan cover to cover the cooling fan. The fan cover may include a first cover and a second cover independent of the first cover and provided lower than the first cover.

The working machine may further include a first driven device and a second driven device provided at one of opposite sides of the prime mover that is closer to the cooling fan than the other, the first driven device and the second driven device being configured to be driven by power from the prime mover. The first cover may be positioned to cover the first driven device. The second cover may be positioned to cover the second driven device.

The working machine may further include a first driving portion to receive power transmitted from the prime mover to drive the first driven device, and a second driving portion to receive power transmitted from the prime mover to drive the second driven device. The first cover may cover the first driving portion. The second cover may cover the second driving portion.

The first driving portion and the second driving portion may be offset relative to each other in an up-down direction, a machine-body width direction, and in a front-rear direction.

The first cover and the second cover may each have an opening facing toward the prime mover.

The working machine may further include a hood to define a prime mover room to house the prime mover, and a support frame to support the hood. The first cover and the second cover may be attached to the support frame.

The support frame may include a leg portion including a first section located rearward of the cooling fan and a second section extending forward from an upper portion of the first section. The first cover may be attached to the upper portion of the first section and the second section. The second cover may be attached to a lower portion of the first section.

The working machine may further include a reserve tank to store liquid. The fan cover may include a tank mounting member to attach the reserve tank thereto.

The working machine may further include an air cleaner to clean air supplied to the prime mover, and an indicator to provide an indication relating to the air cleaner. The fan cover may include an indicator mounting member to attach the indicator thereto.

The above and other elements, features, steps, characteristics and advantages of the present invention will become more apparent from the following detailed description of the example embodiments with reference to the attached drawings.

BRIEF DESCRIPTION OF THE DRAWINGS

A more complete appreciation of example embodiments of the present invention and many of the attendant advantages thereof will be readily obtained as the same becomes better understood by reference to the following detailed description when considered in connection with the accompanying drawings described below.

FIG. 14 is a top plan sectional view illustrating the support frame, the partition plate, the shroud, and the like.

FIG. 15 is a rear sectional view illustrating the support frame, the partition plate, the shroud, and the like.

FIG. 32 is a rear view illustrating the prime mover, the fan cover, a compressor, an alternator, a cooling fan, the shroud, the partition plate, and the like.

FIG. 33 is a side view illustrating the fan cover, the compressor, the alternator, the cooling fan, and the like.

FIG. 34 is a rear view illustrating the fan cover, the compressor, the alternator, the cooling fan, the shroud, the support frame, and the like.

DETAILED DESCRIPTION OF THE EXAMPLE EMBODIMENTS

Figure 1:
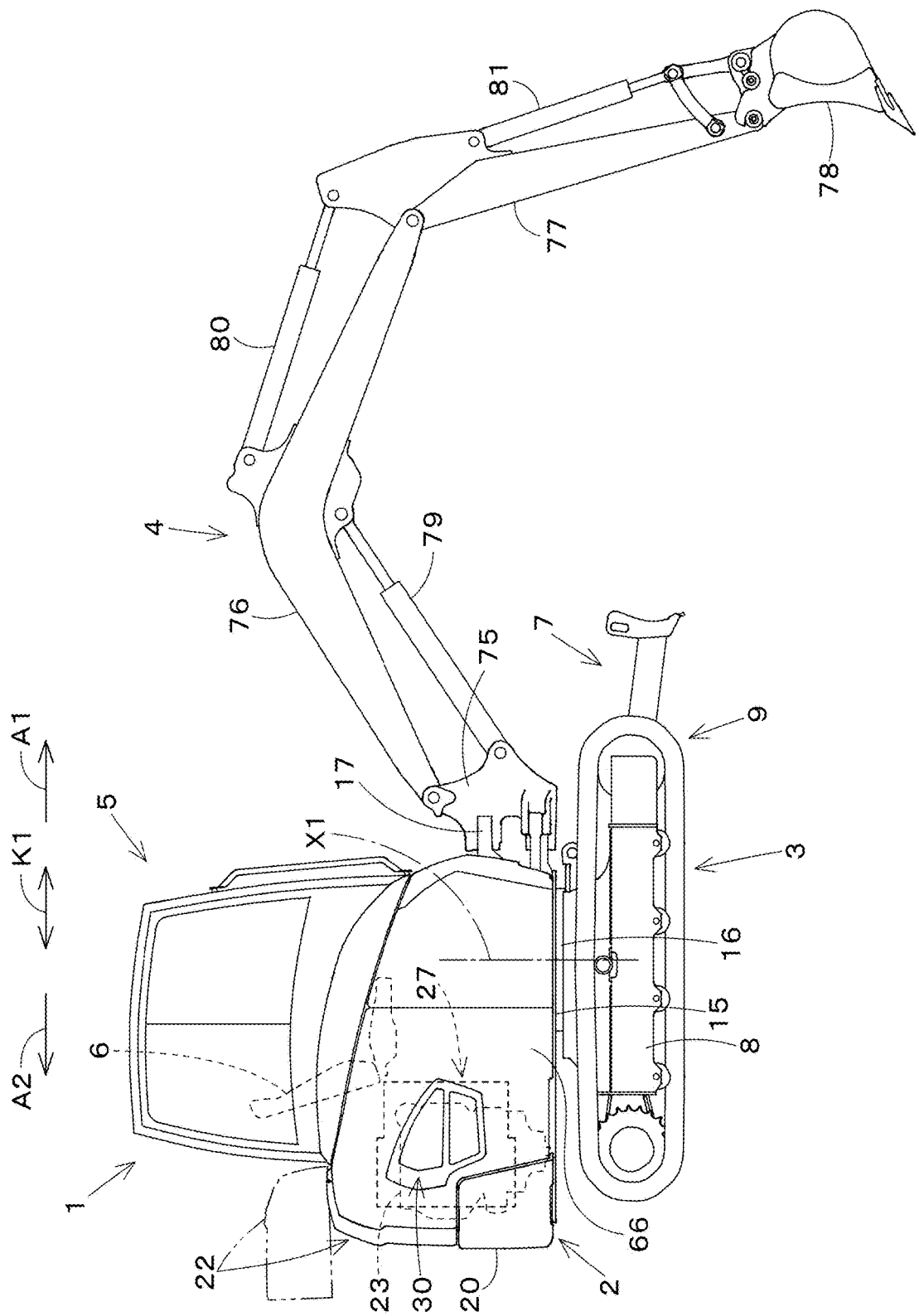
FIG. 1 is a side view of a working machine.

Example embodiments will now be described with reference to the accompanying drawings, wherein like reference numerals designate corresponding or identical elements throughout the various drawings. The drawings are to be viewed in an orientation in which the reference numerals are viewed correctly.

Example embodiments of the present invention will be described below with reference where appropriate to the drawings.

Figure 2:
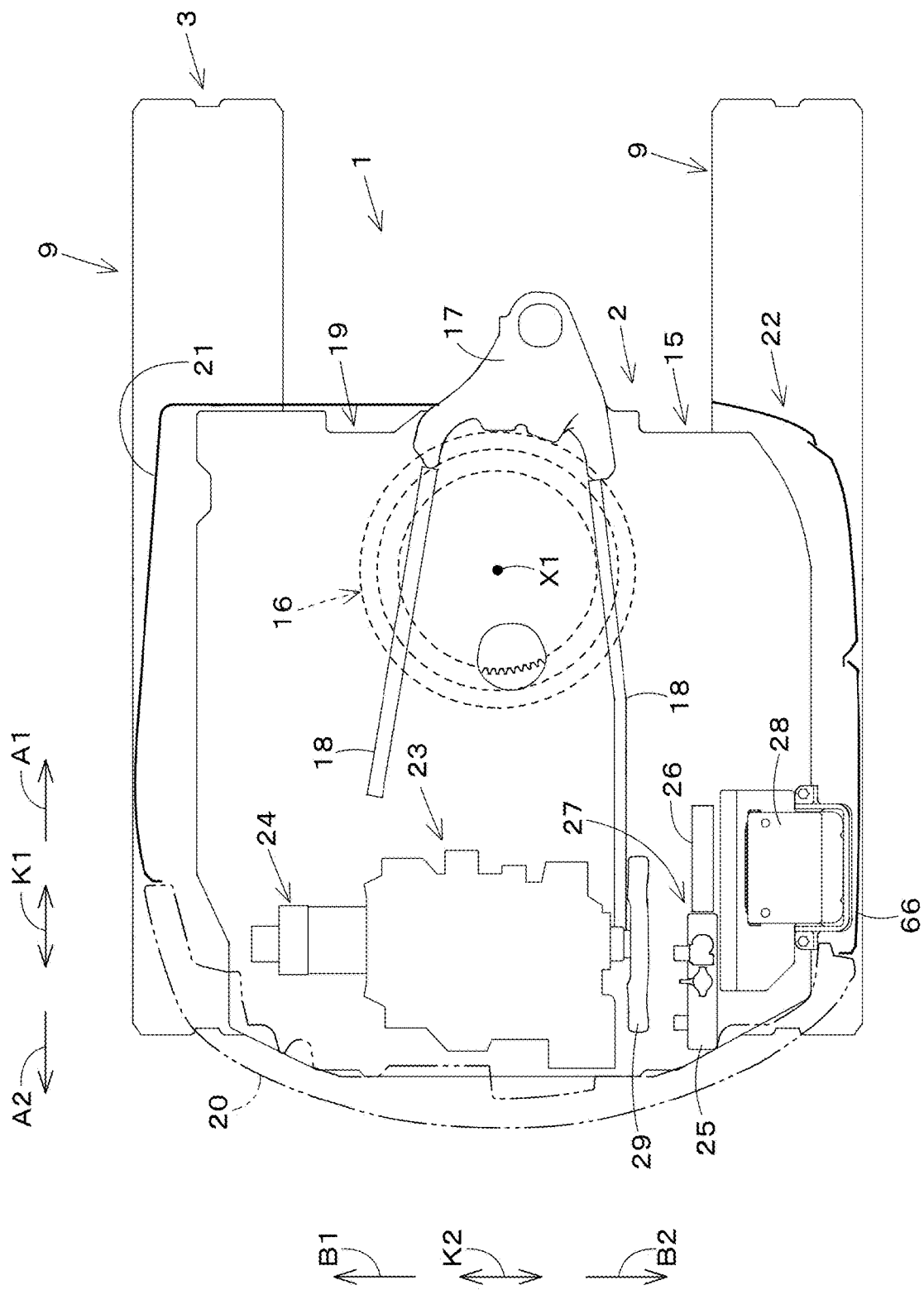
FIG. 2 is a top plan view illustrating a machine body and a traveling device.

FIG. 1 is a schematic side view illustrating an overall configuration of a working machine 1 according to the present example embodiment. FIG. 2 is a schematic top plan view of the working machine 1 with a working device 4 omitted. In the present example embodiment, a backhoe, which is a swivel working machine, is illustrated as the working machine 1.

As illustrated in FIG. 1, the working machine 1 includes a machine body (swivel base) 2, a traveling device 3, and the working device 4. A cabin 5 is mounted on the machine body 2. An operator's seat 6 on which an operator is to sit is provided inside the cabin 5. The operator's seat 6 is surrounded by the cabin 5.

In the present example embodiment, a direction (indicated by an arrow A1 in FIGS. 1 and 2) extending forward from an operator sitting in the operator's seat 6 of the working machine 1 will be referred to as a forward direction (machine-body forward direction), and a direction (indicated by an arrow A2 in FIGS. 1 and 2) extending rearward from the operator will be referred to as a rearward direction (machine-body rearward direction).

Furthermore, a direction (farther away from the viewer of FIG. 1 and indicated by an arrow B1 in FIG. 2) extending leftward from the operator will be referred to as a leftward direction, and a direction (closer to the viewer of FIG. 1 and indicated by an arrow B2 in FIG. 2) extending rightward from the operator will be referred to as a rightward direction.

Moreover, a horizontal direction orthogonal to a front-rear direction (machine-body front-rear direction) K1 will be described as a machine-body width direction (left-right direction) K2 (refer to FIG. 2). A direction extending rightward or leftward from the widthwise center of the machine body 2 will be described as a machine-body-width outward direction. In other words, the machine-body-width outward direction is a direction away from the widthwise center of the machine body 2 in the machine-body width direction K2. A direction opposite to the machine-body-width outward direction will be described as a machine-body-width inward direction. In other words, the machine-body-width inward direction is a direction toward the widthwise center of the machine body 2 in the machine-body width direction K2.

As illustrated in FIG. 1, the traveling device 3 in the present example embodiment is a crawler type traveling device including a traveling frame 8 and crawler type traveling mechanisms 9 provided on the left and right of the traveling frame 8. A dozer device 7 is attached to a front portion of the traveling device 3.

The machine body 2 is mounted on the traveling frame 8 such that the machine body 2 can swivel left and right. More specifically, as illustrated in FIGS. 1 and 2, the machine body 2 includes a swivel base plate 15 that is a base plate defining a bottom portion of the machine body 2. The swivel base plate 15 is formed from a thick plate material, and is provided such that its plate surface faces vertically or in an up-down direction. The swivel base plate 15 is supported on the traveling frame 8 by a swivel bearing 16 such that the swivel base plate 15 is rotatable about an axis (swivel axis X1) extending in the up-down direction. Thus, the machine body 2 is supported by the traveling frame 8 such that the machine body 2 can swivel.

As illustrated in FIG. 2, the swivel axis X1 is located in a front portion of the machine body 2 (swivel base plate 15) and at substantially the middle of the machine body 2 in the machine-body width direction K2. The machine body 2 includes a swivel frame 19 including the swivel base plate 15, a support bracket 17 fixed to the front portion of the swivel base plate 15 and protruding forward from the swivel base plate 15, and a pair of vertical ribs 18 extending rearward from left and right rear portions of the support bracket 17 and fixed to the swivel base plate 15.

As illustrated in FIG. 1, the support bracket 17 supports a swing bracket 75 such that the swing bracket 75 is pivotable about an axis extending in the up-down direction. The working device 4 is attached to the swing bracket 75.

As illustrated in FIG. 1, the working device 4 includes a boom 76, a boom cylinder 79, an arm 77, an arm cylinder 80, a working tool (bucket) 78, and a working tool cylinder (bucket cylinder) 81. The boom 76 includes a proximal end pivotally coupled to the swing bracket 75 and is swingable in the up-down direction. The boom cylinder 79 retracts or extends to drive and swing the boom 76. The arm 77 is pivotally coupled to a distal end of the boom 76 and is swingable in the front-rear direction K1. The arm cylinder 80 retracts or extends to drive and swing the arm 77. The working tool 78 is pivotally coupled to a distal end of the arm 77 and is swingable in the front-rear direction K1. The working tool cylinder 81 retracts or extends to drive and swing the working tool 78. In the present example embodiment, a bucket is illustrated as the working tool 78.

The machine body 2 includes a weight 20 attached to a rear portion of the swivel frame 19 (swivel base plate 15) and a swivel cover 21 (refer to FIG. 2) that is located below the cabin 5 and that covers a left side and a left front surface of the swivel frame 19.

As illustrated in FIG. 2, the weight 20 extends from one side (right side) of the swivel base plate 15 in the machine-body width direction K2 past the rear of the swivel base plate 15 to the other side (left side) of the swivel base plate 15 in the machine-body width direction K2.

The machine body 2 includes a hood 22 covering various devices, various apparatuses, and the like (arranged above the swivel frame 19) mounted on the machine body 2. The hood 22 defines a right front surface of the machine body, a right side surface of the machine body, upper surfaces of right and rear portions of the machine body, and a rear surface of the machine body that is located above the weight 20.

The various devices, various apparatuses, and the like include a prime mover 23 configured as any type of engine, motor, or the like, a pump unit 24 including a plurality of pumps that deliver hydraulic fluid for operating a hydraulic actuator, pilot hydraulic fluid for operating a valve, and hydraulic fluid for signals, a cooling device unit 27 including cooling devices, such as a radiator 25 and an oil cooler 26, a battery 28 that supplies power to, for example, electrical components, a fuel tank storing fuel for the prime mover 23, and a hydraulic fluid tank storing the hydraulic fluid.

As illustrated in FIG. 2, the prime mover 23 is provided in the middle of the rear portion of the swivel base plate 15 in the machine-body width direction K2 and in front of the weight 20. The pump unit 24 is attached to a side (left portion) of the prime mover 23 in the machine-body width direction K2. The cooling device unit 27 is provided beside (or to the right of) the prime mover 23 in the machine-body width direction K2. A cooling fan 29 provided between the prime mover 23 and the cooling device unit 27 is attached to the prime mover 23. The cooling fan 29 is provided beside (or to the right of) the prime mover 23 and is driven by a driving force from the prime mover 23. Furthermore, the cooling fan 29 is a suction type fan that draws air from the area on the right of the cooling device unit 27 to generate a cooling air flow flowing toward the prime mover 23. A rear portion of a right side of the hood 22 has an outdoor air intake portion 30 (refer to FIG. 1) through which outdoor air is taken into the hood 22.

Figure 4:
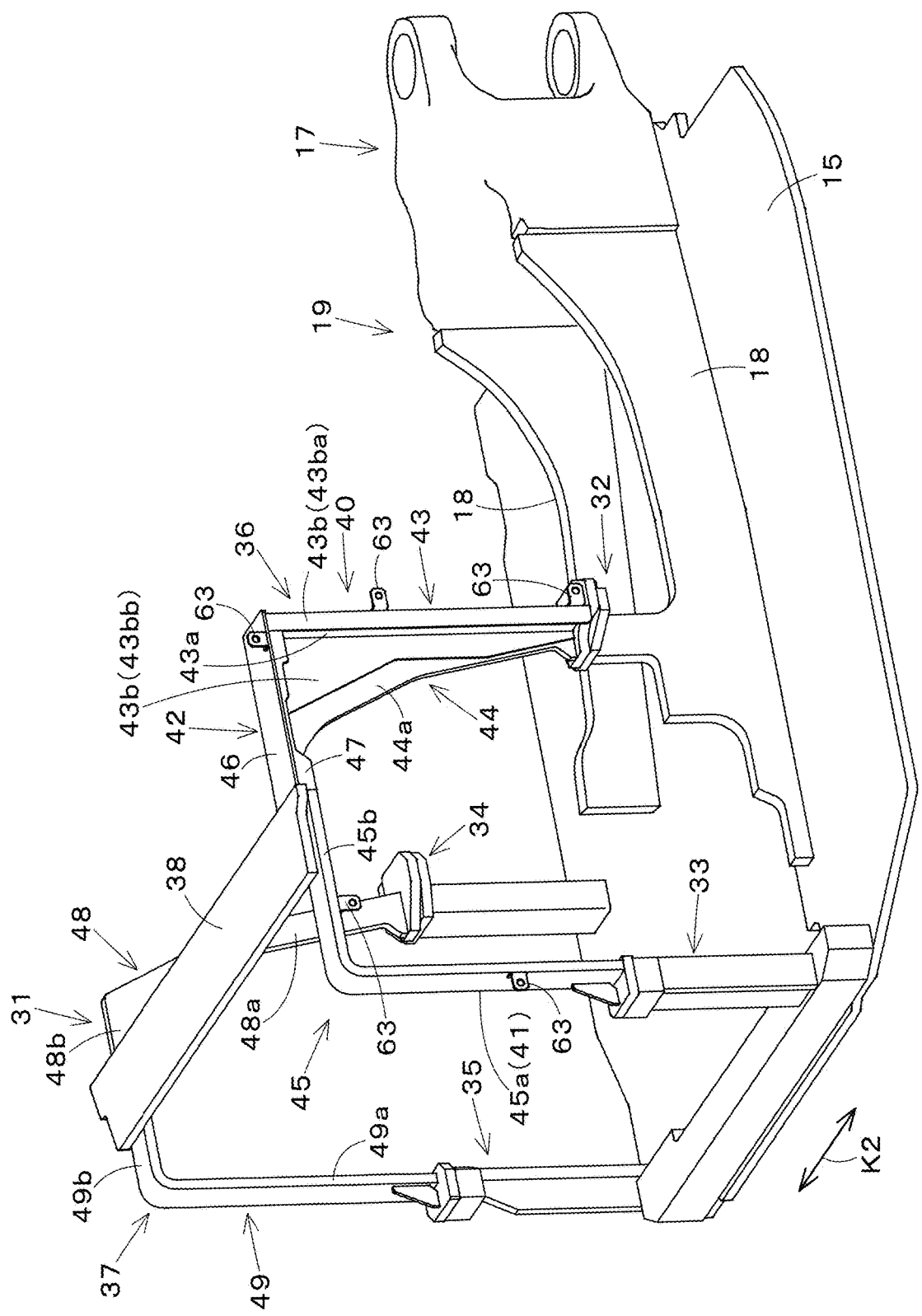
FIG. 4 is a perspective view of a support frame and a swivel frame.
Figure 12:
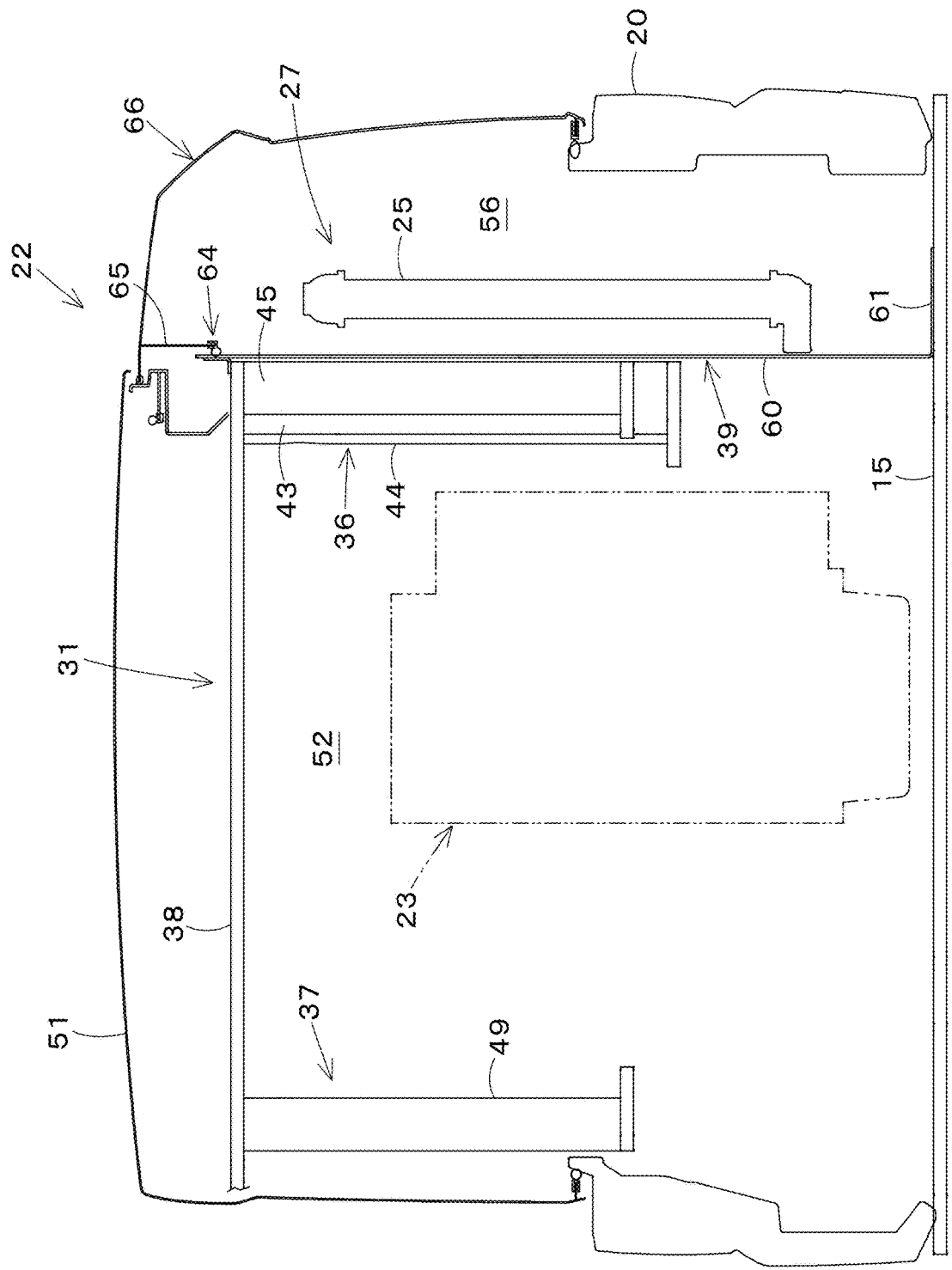
FIG. 12 is a rear sectional view illustrating the prime mover room and an arrangement area for the cooling devices.

As illustrated in FIG. 4, the swivel frame 19 (machine body 2) includes a support frame 31 mounted on the swivel frame 19. More specifically, the support frame 31 stands on the rear portion of the swivel frame 19 (machine body 2). As illustrated in FIG. 12, the support frame 31 is provided inside the hood 22. Furthermore, the support frame 31 supports the hood 22.

As illustrated in FIG. 4, the support frame 31 is attached to a plurality of frame mounts (a first frame mount 32, a second frame mount 33, a third frame mount 34, a fourth frame mount 35) provided on the swivel base plate 15.

Figure 5:
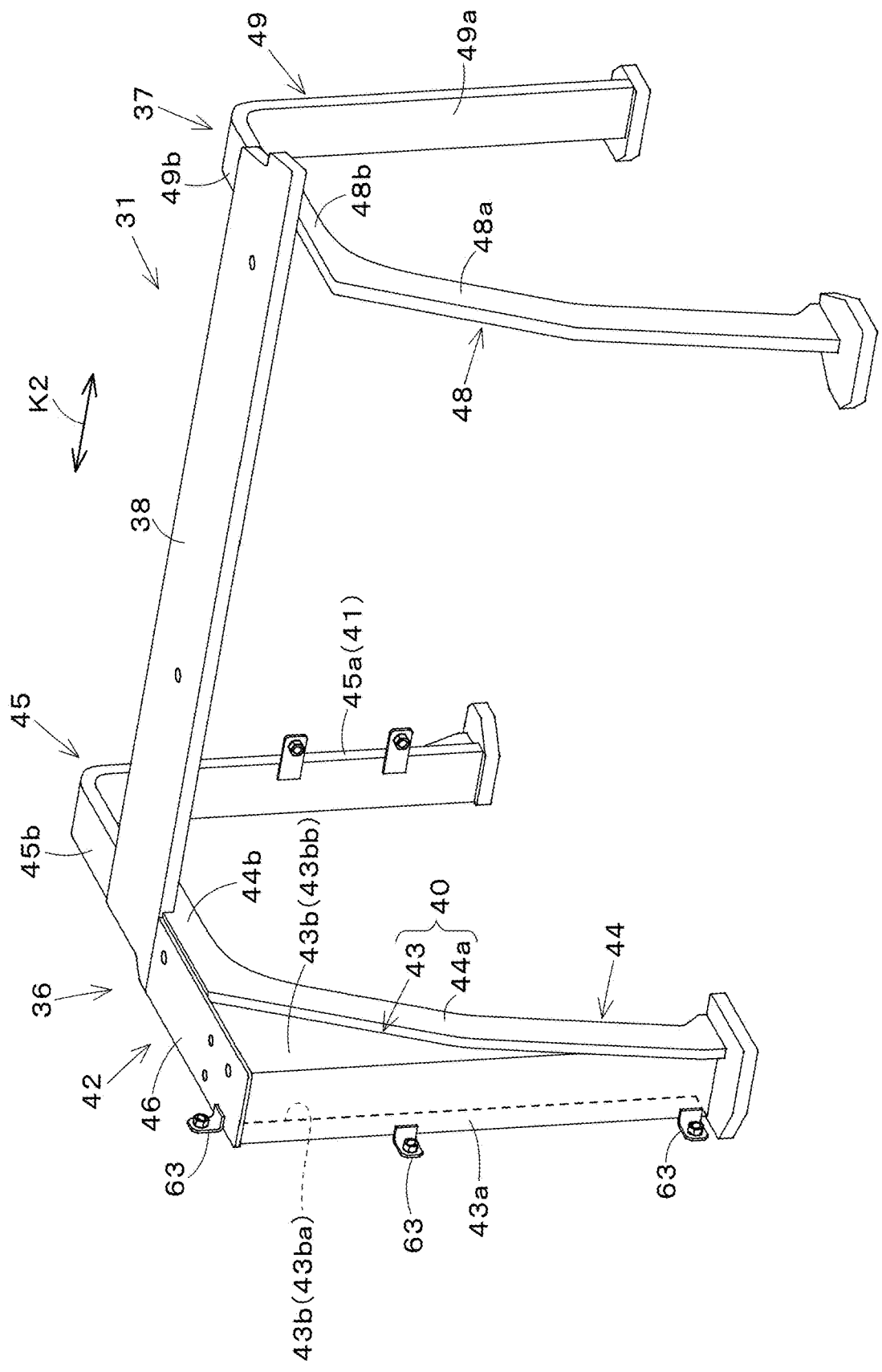
FIG. 5 is a perspective view of the support frame.

As illustrated in FIGS. 4 and 5, the support frame 31 includes a first structure 36 constituting a right portion of the support frame 31, a second structure 37 constituting a left portion of the support frame 31, and an upper plate 38 coupling the first structure 36 and the second structure 37. The support frame 31 is formed from a plate material.

As illustrated in FIG. 12, the first structure 36 is provided to the right of the prime mover 23. The first structure 36 is provided between the prime mover 23 and a partition plate (plate member) 39, which will be described later.

As illustrated in FIGS. 4 and 5, the first structure 36 includes a front structure portion 40, a rear structure portion 41 provided rearward of and apart from the front structure portion 40, and an upper structure portion 42 coupling an upper portion of the front structure portion 40 and an upper portion of the rear structure portion 41.

The front structure portion 40 includes a first front leg 43 and a first section 44a of a second front leg 44. The first front leg 43 includes a front panel 43a and a pair of, or left and right, side panels 43b.

The front panel 43a is provided such that its plate surface faces in the front-rear direction, and is elongated in the up-down direction. The right side panel is referred to as a first side panel 43ba. The left side panel is referred to as a second side panel 43bb. The first side panel 43ba extends rearward from a right edge of the front panel 43a. The second side panel 43bb extends rearward from a left edge of the front panel 43a.

The first section 44a of the second front leg 44 extends diagonally rearward and upward. The first section 44a is fixed to the second side panel 43bb. The first front leg 43 and the first section 44a of the second front leg 44 are attached to the first frame mount 32 (refer to FIG. 4).

The second front leg 44 includes a second section 44b extending rearward from the first section 44a.

The rear structure portion 41 includes a first section 45a of a rear leg (leg portion) 45. The first section 45a of the rear leg 45 extends in the up-down direction. The rear structure portion 41 (rear leg 45) is attached to the second frame mount 33 (see FIG. 4).

The rear leg 45 includes a second section 45b extending forward from an upper portion of the first section 45a. The second section 45b is located higher than a shroud 57 (see FIG. 11). Therefore, the second section 45b is located higher than the cooling fan 29 (see FIG. 34).

The upper structure portion 42 couples the upper portion of the front structure portion 40 and the upper portion of the rear structure portion 41. The upper structure portion 42 is located higher than the shroud 57 and the cooling fan 29. The upper structure portion 42 includes a plate member 46, the second section 44b of the second front leg 44, the second section 45b of the rear leg 45, and a side plate 47. The plate member 46 is provided such that its plate surface faces in the up-down direction. The plate member 46 includes a front portion fixed to an upper portion of the first front leg 43, extends rearward, and is formed from a plate material. The side plate 47 is coupled to an upper portion of the first side panel 43ba, the second section 45b of the rear leg 45, and a right portion of a lower surface of the plate member 46.

As illustrated in FIGS. 4 and 5, the second structure 37 is provided to the left of the first structure 36 and is apart from the first structure 36. As illustrated in FIG. 12, the second structure 37 is provided to the left of the prime mover 23.

As illustrated in FIGS. 4 and 5, the second structure 37 includes a front leg 48 and a rear leg 49.

The front leg 48 includes a first section 48a extends diagonally rearward and upward and a second section 48b that extends rearward from an upper portion of the first section 48a. The front leg 48 is attached to the third frame mount 34 (refer to FIG. 4).

The rear leg 49 includes a first section 49a extending in the up-down direction and a second section 49b extending forward from an upper portion of the first section 49a and coupled to the second section 48b of the front leg 48. The rear leg 49 is attached to the fourth frame mount 35 (refer to FIG. 4).

As illustrated in FIGS. 4 and 5, the upper plate 38 is formed from an elongated plate material extending in the machine-body width direction K2. The upper plate 38 is provided such that its plate surface faces in the up-down direction. Furthermore, the upper plate 38 is provided on and between the middle of an upper portion of the first structure 36 in the front-rear direction K1 and the middle of an upper portion of the second structure 37 in the front-rear direction K1.

In the present example embodiment, the support frame 31 is attached to the members fixed to the swivel base plate 15. This does not imply any limitation. The support frame 31 may be fixed directly to the swivel base plate 15. In other words, the support frame 31 is attached directly or indirectly to the swivel base plate 15.

Figure 6:
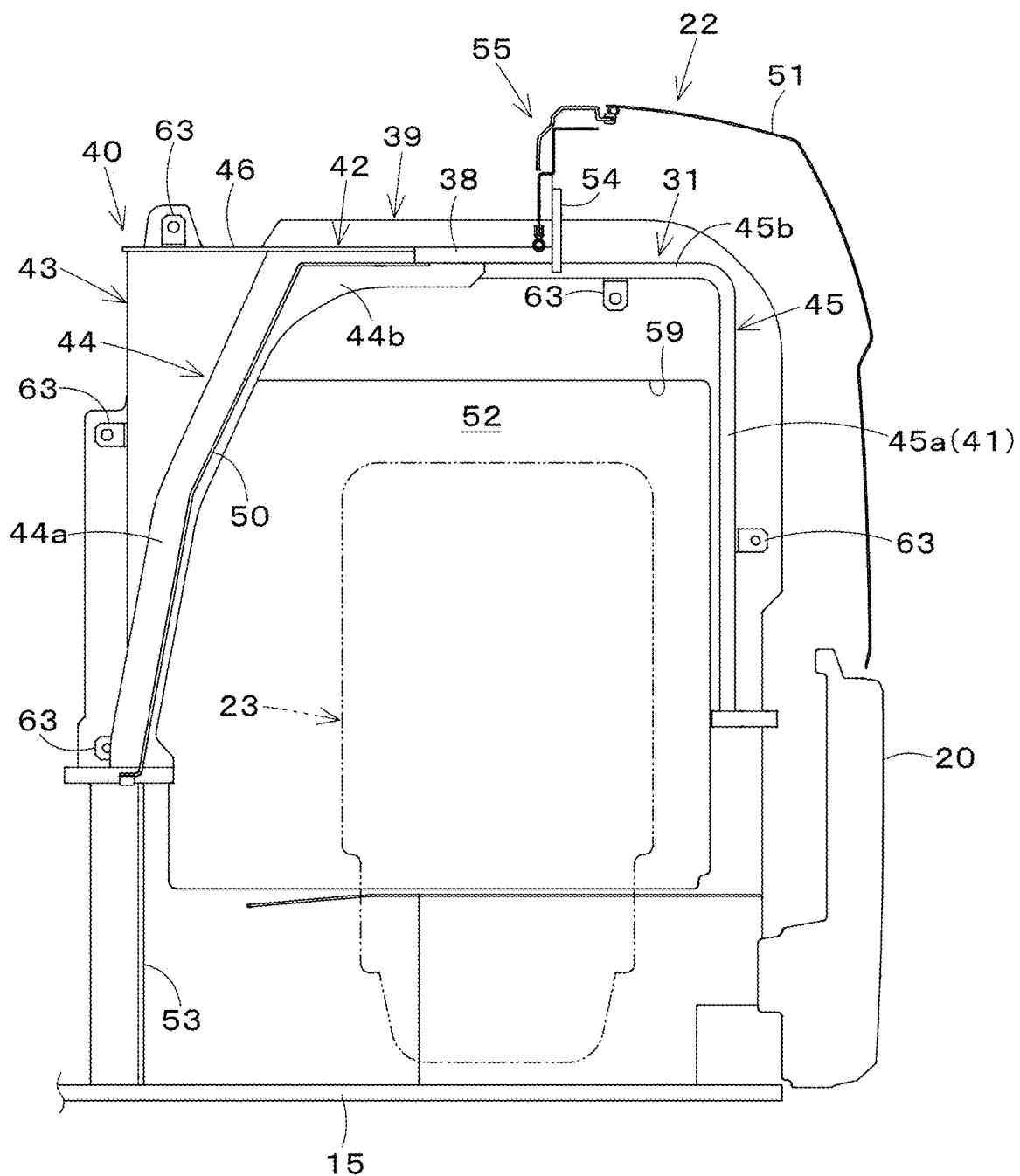
FIG. 6 is side sectional view illustrating a prime mover room.
Figure 7:
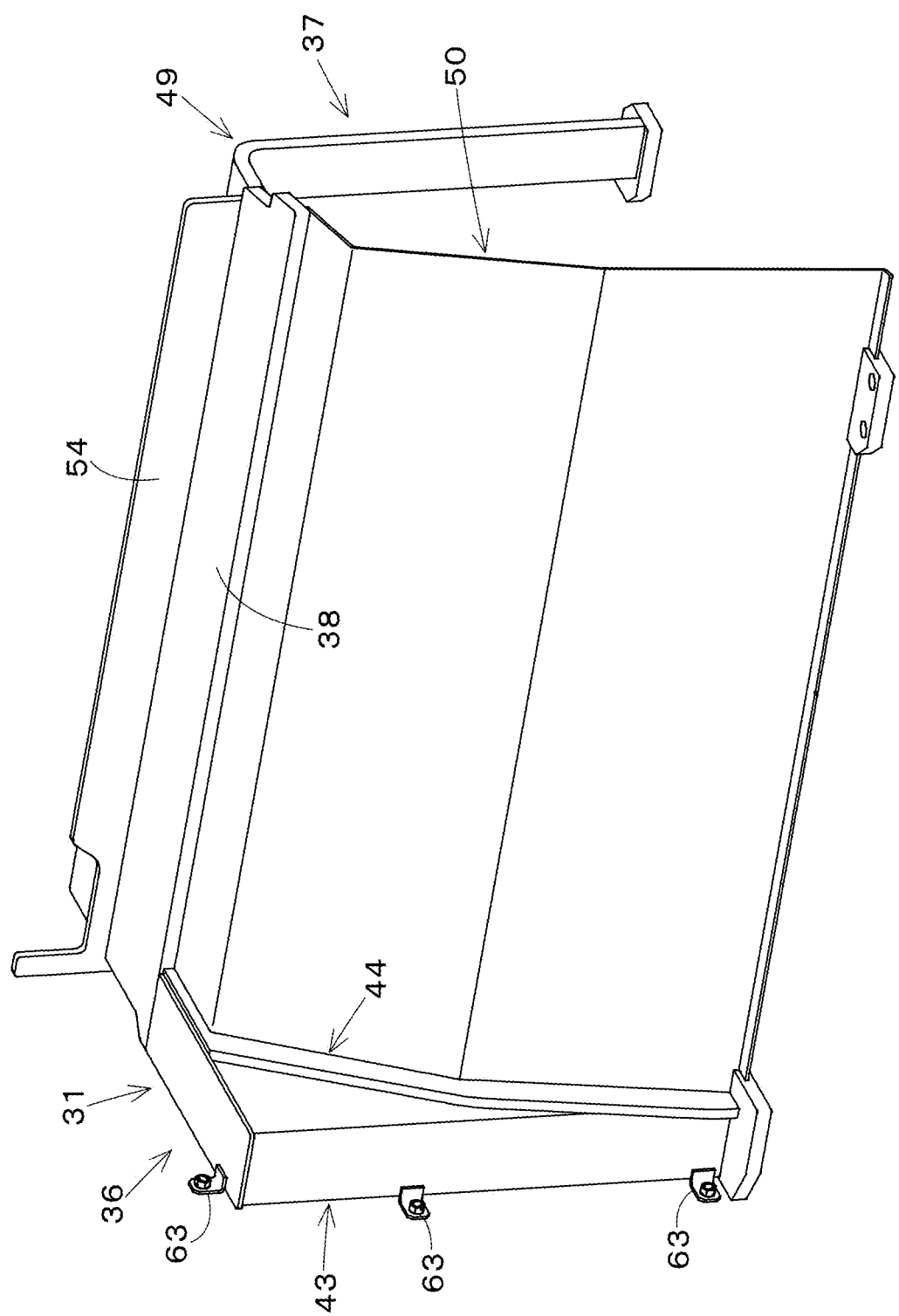
FIG. 7 is a perspective view of the support frame and a barrier member.

As illustrated in FIG. 6, the hood 22 includes a barrier member 50 and an openable hood rear portion (covering member) 51. The barrier member 50 covers an area above the front portion of the prime mover 23 and the front (area in front of the upper portion) of the prime mover 23. The barrier member 50 extends from the second front leg 44 to the second structure 37 (front leg 48) and is fixed to the support frame 31 (refer to FIG. 7). A portion of the top of the prime mover 23 that is located rearward of an upper portion of the barrier member 50 is covered by the upper plate 38.

As illustrated in FIG. 6, a partition member 53 defining a lower front portion of a prime mover room 52 housing the prime mover 23 is provided below the barrier member 50. The hood rear portion 51, which is openable, covers the rear of the prime mover 23. The hood rear portion 51 is supported by a support plate 54 (refer to FIG. 7) provided on the support frame 31 via a hinge device (not illustrated) such that the hood rear portion 51 is swingable in the up-down direction or vertically. Vertically swinging the hood rear portion 51 opens or closes the prime mover room 52.

As illustrated in FIG. 6, a guard portioning member 55 covers a space between an upper front edge of the hood rear portion 51 and the upper plate 38. The weight 20 is provided below the hood rear portion 51. The weight 20 covers a rear lower portion of the prime mover 23. The swivel base plate 15 covers the bottom of the prime mover 23.

The barrier member 50, the hood rear portion 51, the partition member 53, the weight 20, the swivel base plate 15, the support plate 54, the guard portioning member 55, the upper plate 38, and the like define the prime mover room 52.

Figure 10:
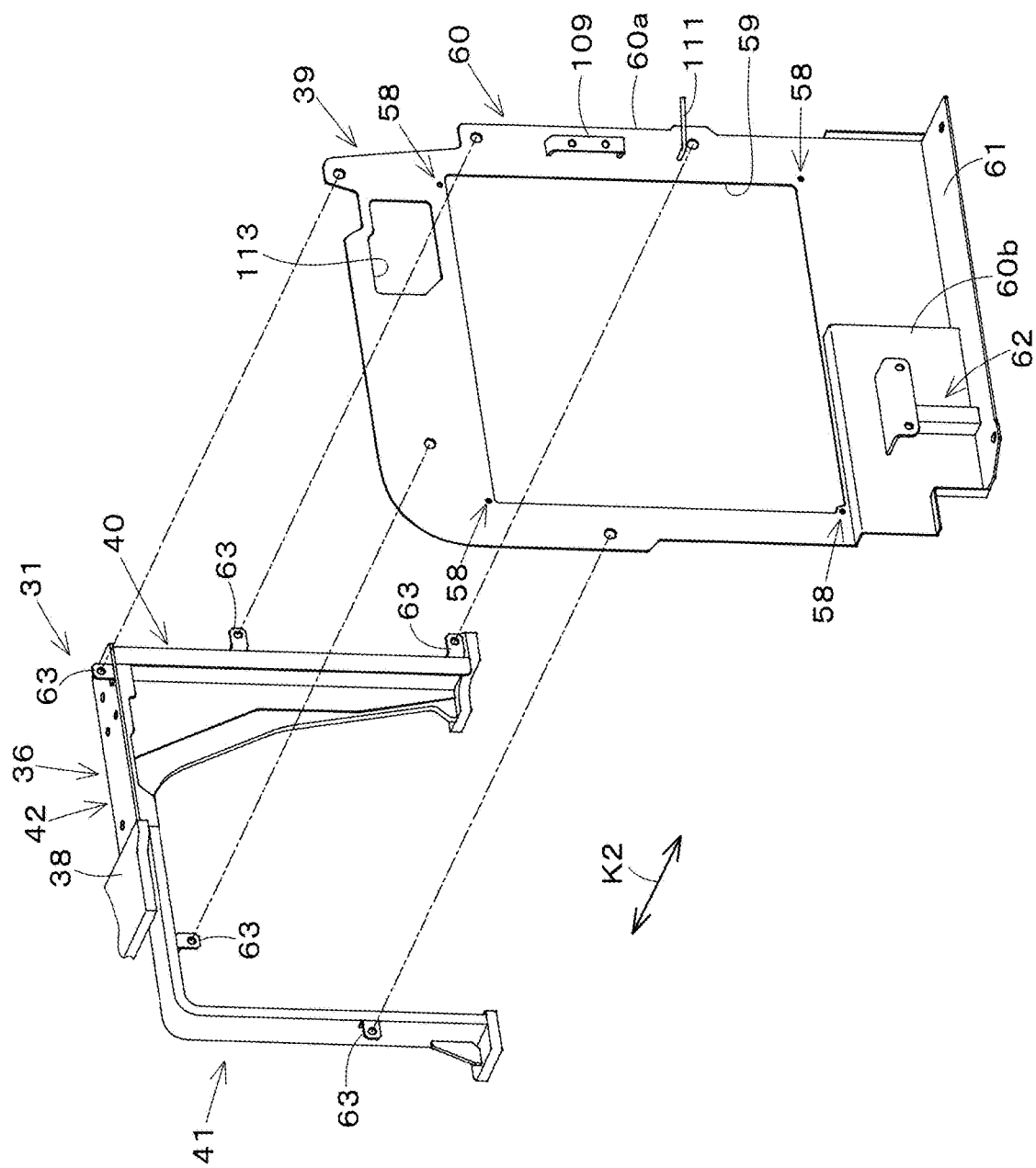
FIG. 10 is an exploded perspective view illustrating the support frame and the partition plate.
Figure 11:
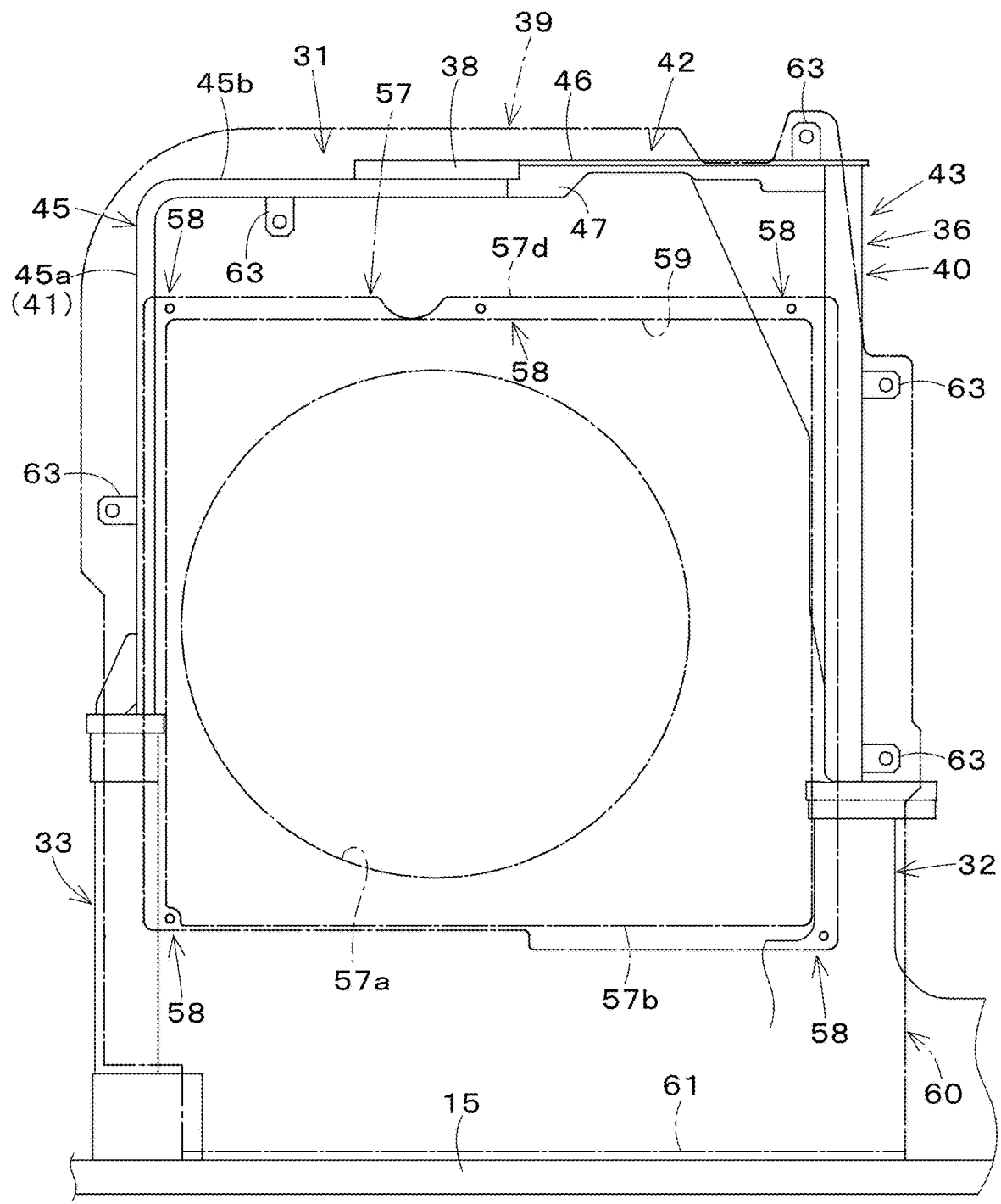
FIG. 11 is a side view of the support frame, the partition plate, and a shroud.

As illustrated in FIGS. 10 and 11, the partition plate 39 is attached to the support frame 31. The partition plate 39 is formed from a plate material. As illustrated in FIG. 12, the partition plate 39 is a member that separates the prime mover room 52 housing the prime mover 23 from a cooling-device arrangement area 56 where the cooling devices, such as the radiator 25 and the oil cooler 26, are provided. A lower portion of the partition plate 39 is attached to the swivel base plate 15.

Figure 13:
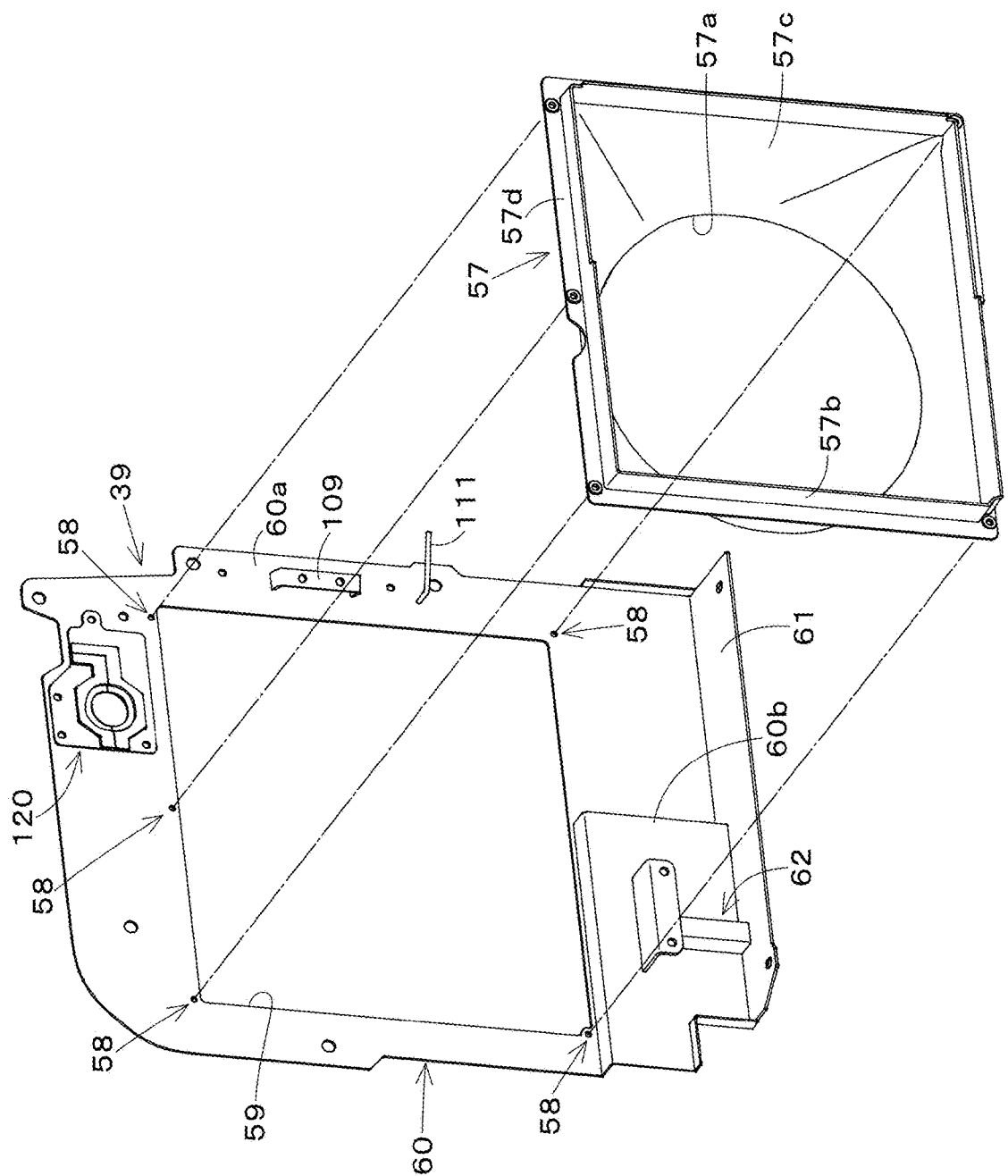
FIG. 13 is an exploded perspective view illustrating the partition plate and the shroud.
Figure 14:
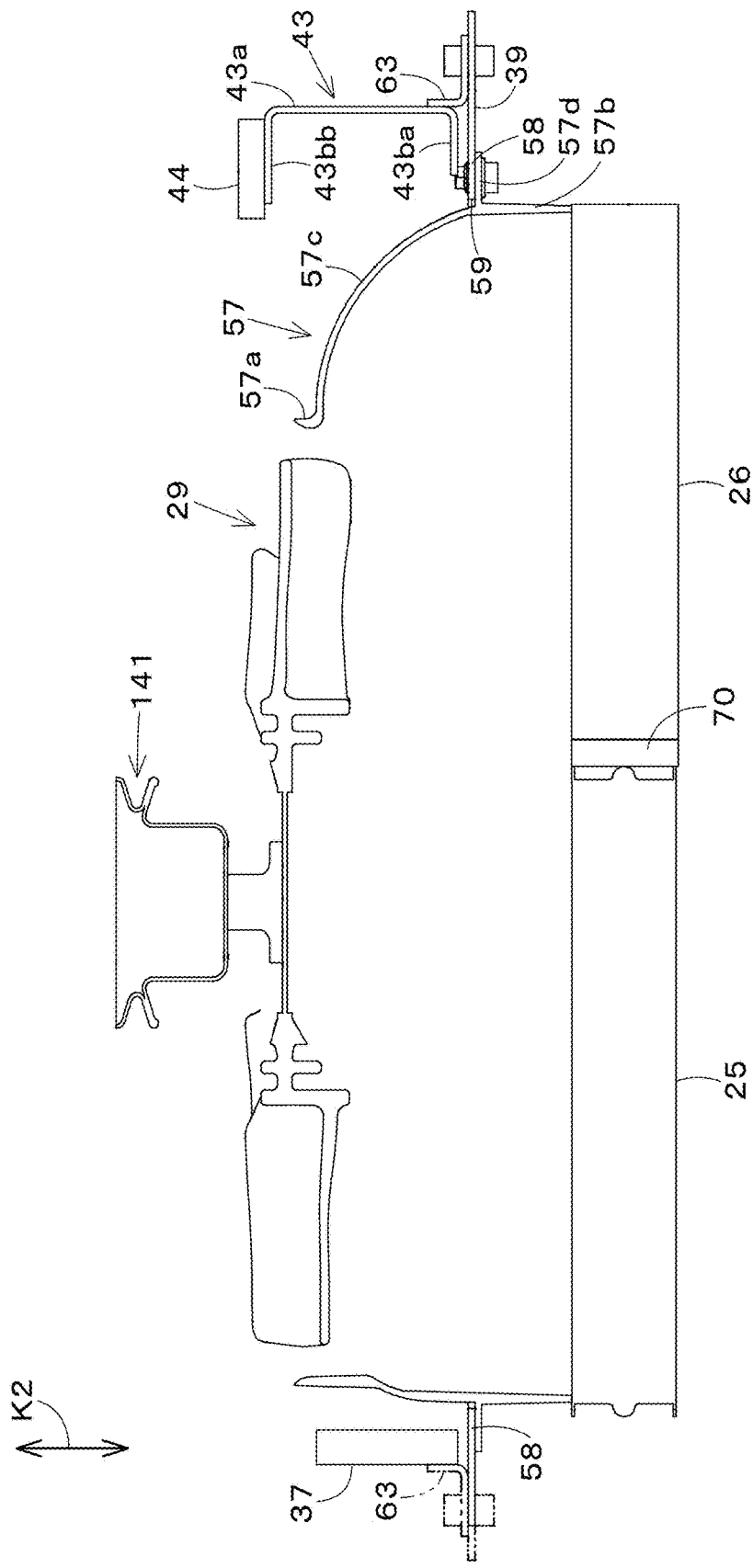
Figure 15:
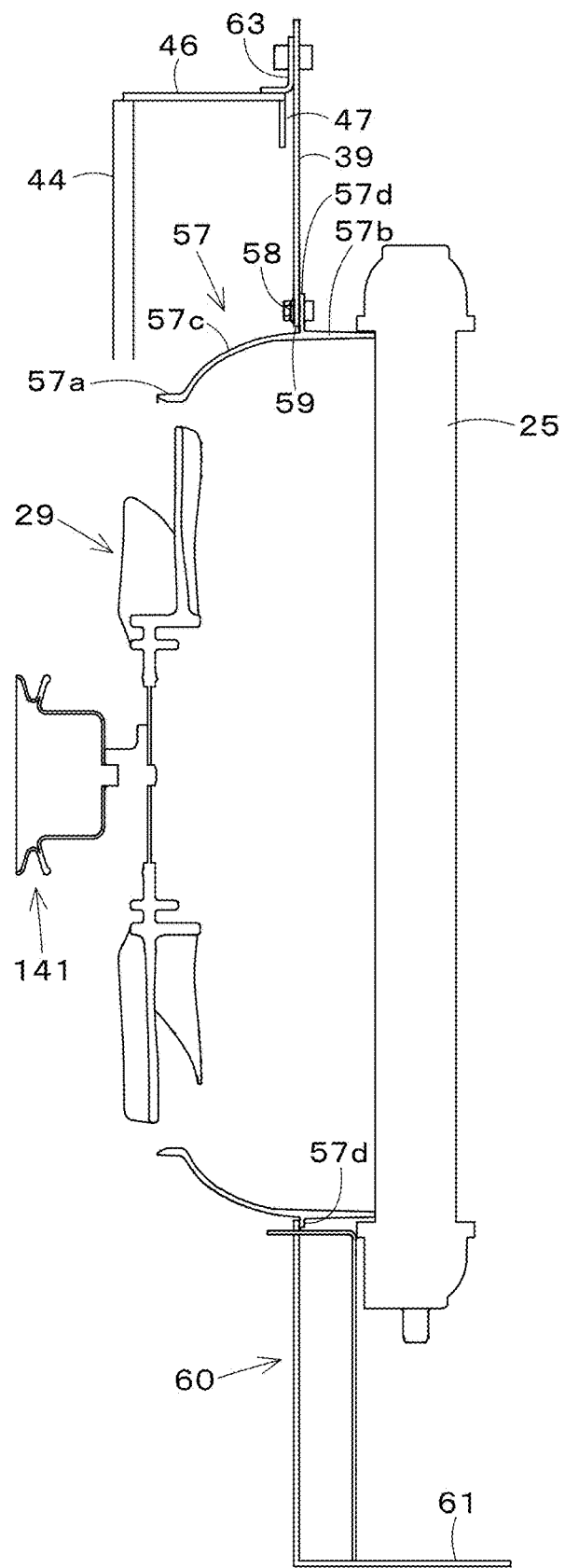

As illustrated in FIGS. 13, 14, and 15, the partition plate 39 includes an opening 59 through which a shroud 57 to guide a cooling air flow cooling the cooling devices can extend and at least one mounting portion (hereinafter, shroud mounting portion) 58 at which the shroud 57 extending through the opening 59 is attached to the partition plate 39.

As illustrated in FIG. 13, the opening 59 has a rectangular shape. The opening 59 is formed to allow the shroud 57 to extend from the cooling-device arrangement area into the prime mover room 52. Multiple (in the present example embodiment, five) shroud mounting portions 58 are provided around the opening 59. The shroud mounting portions 58 each include an insertion aperture through which a bolt extends and a nut provided at a position corresponding to the insertion aperture and fixed to a left surface of the partition plate 39.

Figure 3:
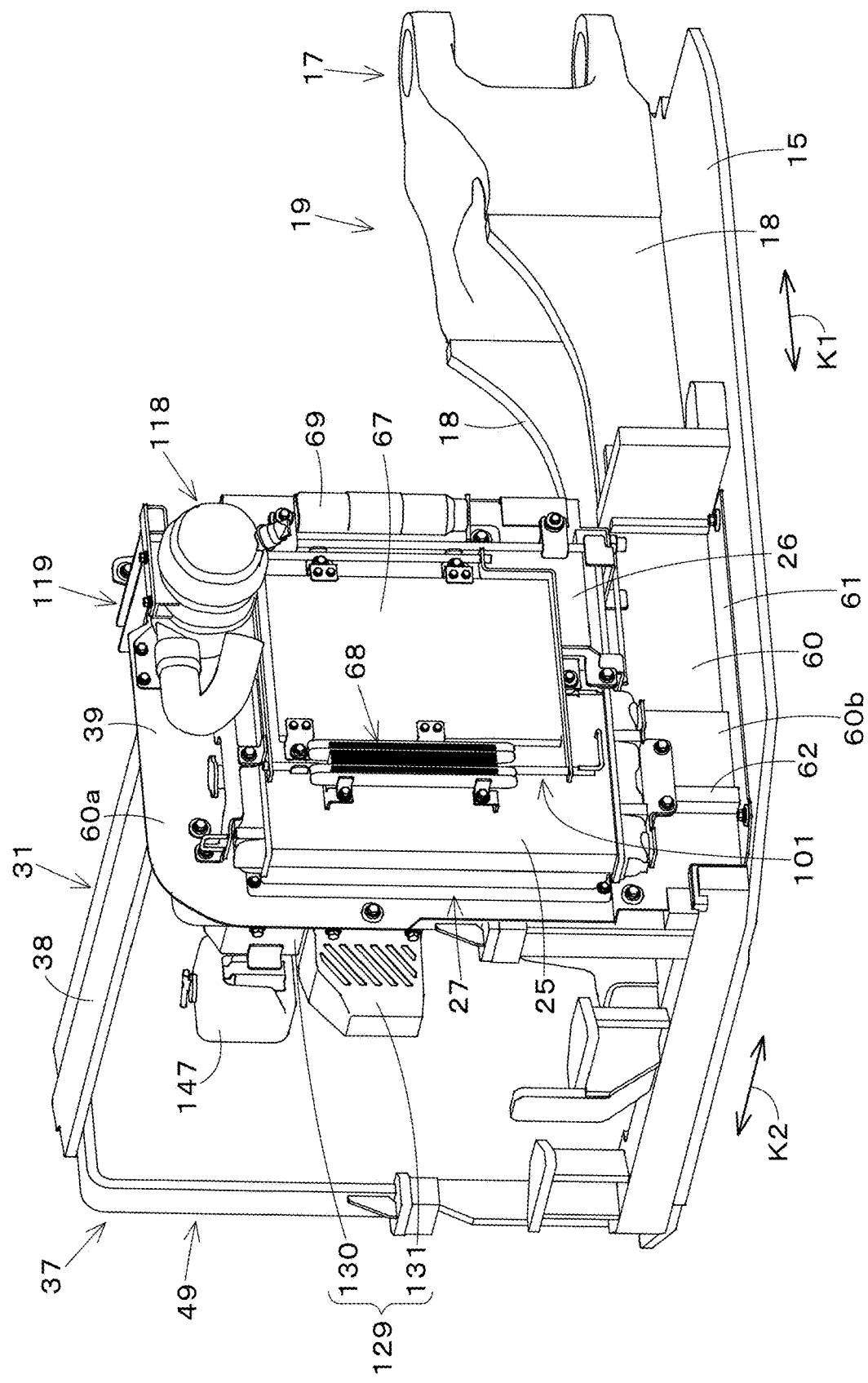
FIG. 3 is a perspective view of mounted components including a partition plate and a cooling device unit.

As illustrated in FIG. 10, the partition plate 39 includes a main plate portion 60 and a lower wall portion 61 (see FIG. 3). The main plate portion 60 includes the opening 59 and the shroud mounting portions 58, and is attached to the support frame 31. The lower wall portion 61 extends horizontally from a lower end of the main plate portion 60, and is attached to the upper surface of the swivel base plate (base plate) 15.

As illustrated in FIG. 10, the main plate portion 60 is provided such that its plate surface faces in the machine-body width direction K2. The main plate portion 60 includes a main plate portion 60a and a bracket fixing portion 60b. The main plate portion 60a has the opening 59 and the shroud mounting portions 58. A mounting member 62 is fixed to the bracket fixing portion 60b.

As illustrated in FIG. 10, multiple (in the present example embodiment, five) mounting stays 63 are fixed to the first structure 36 of the support frame 31. The main plate portion 60 (partition plate 39) is fixed to the mounting stays 63 by, for example, bolts. Furthermore, the main plate portion 60 (partition plate 39) is attached to an outer side (right side) of the first structure 36 (support frame 31) in the machine-body width direction K2. In other words, the main plate portion 60 (partition plate 39) is attached from the side (the cooling-device arrangement area) of the first structure 36 opposite from the prime mover 23.

The lower wall portion 61 extends rightward from the lower end of the main plate portion 60 such that a plate surface of the lower wall portion 61 faces in the up-down direction. The lower wall portion 61 overlies (and is in surface contact with) the swivel base plate 15, and is fixed to the swivel base plate 15 by fasteners, such as bolts (refer to FIG. 3).

As illustrated in FIG. 11, the partition plate 39 is sized to cover a space between the swivel base plate (base plate) 15 and the upper structure portion 42 and extend from the front structure portion 40 to the rear structure portion 41. In other words, the partition plate 39 covers, from the right side (from the outside along the machine-body width direction K2), the space surrounded by the upper structure portion 42, the front structure portion 40, the first frame mount 32, the swivel base plate 15, the second frame mount 33, and the rear structure portion 41.

Gaps between the partition plate 39, the first structure 36, the first frame mount 32, the second frame mount 33, and the right vertical rib 18 are appropriately sealed with a sealing material or a sealing structure.

Figure 8:
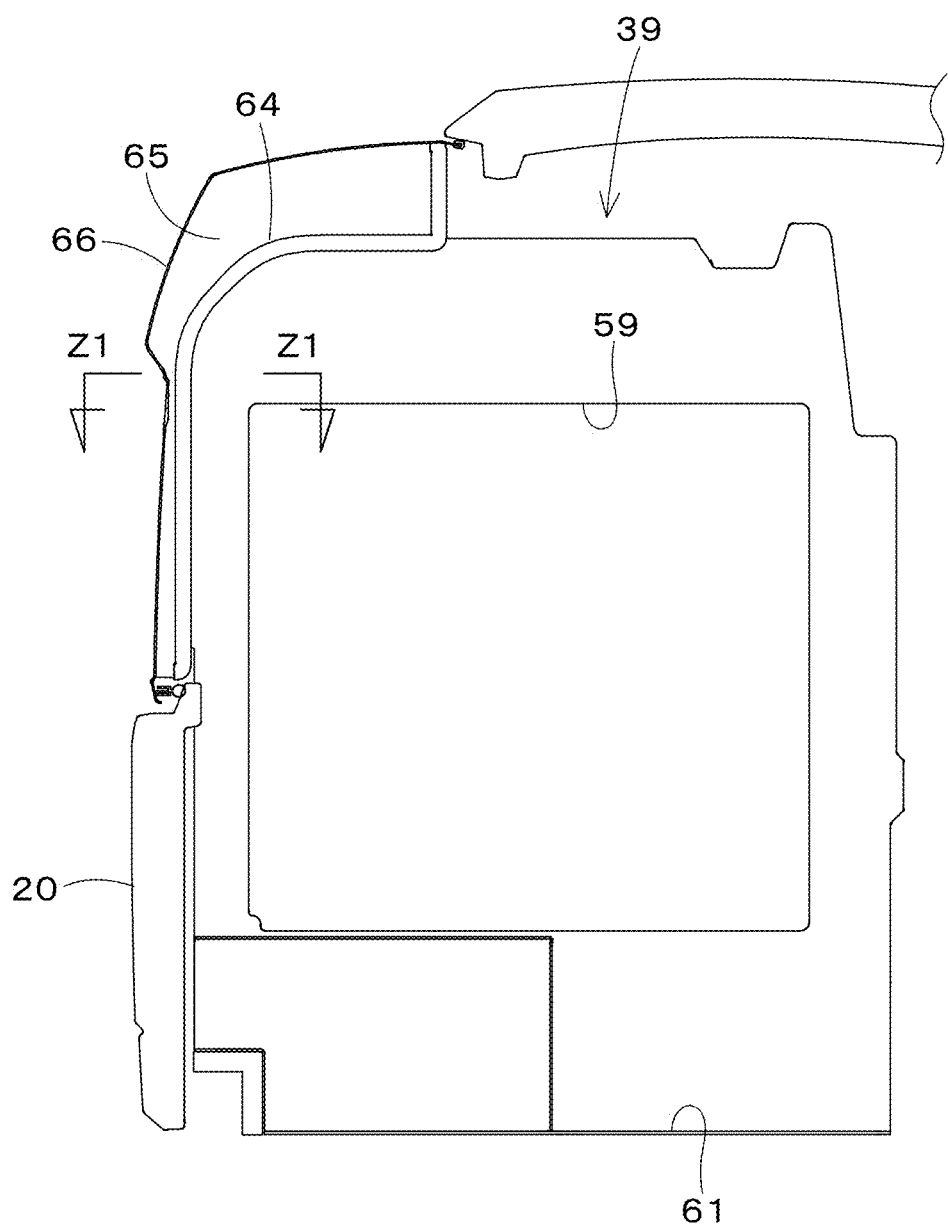
FIG. 8 is a side sectional view illustrating a sealing portion on an upper rear portion of the partition plate.
Figure 9:
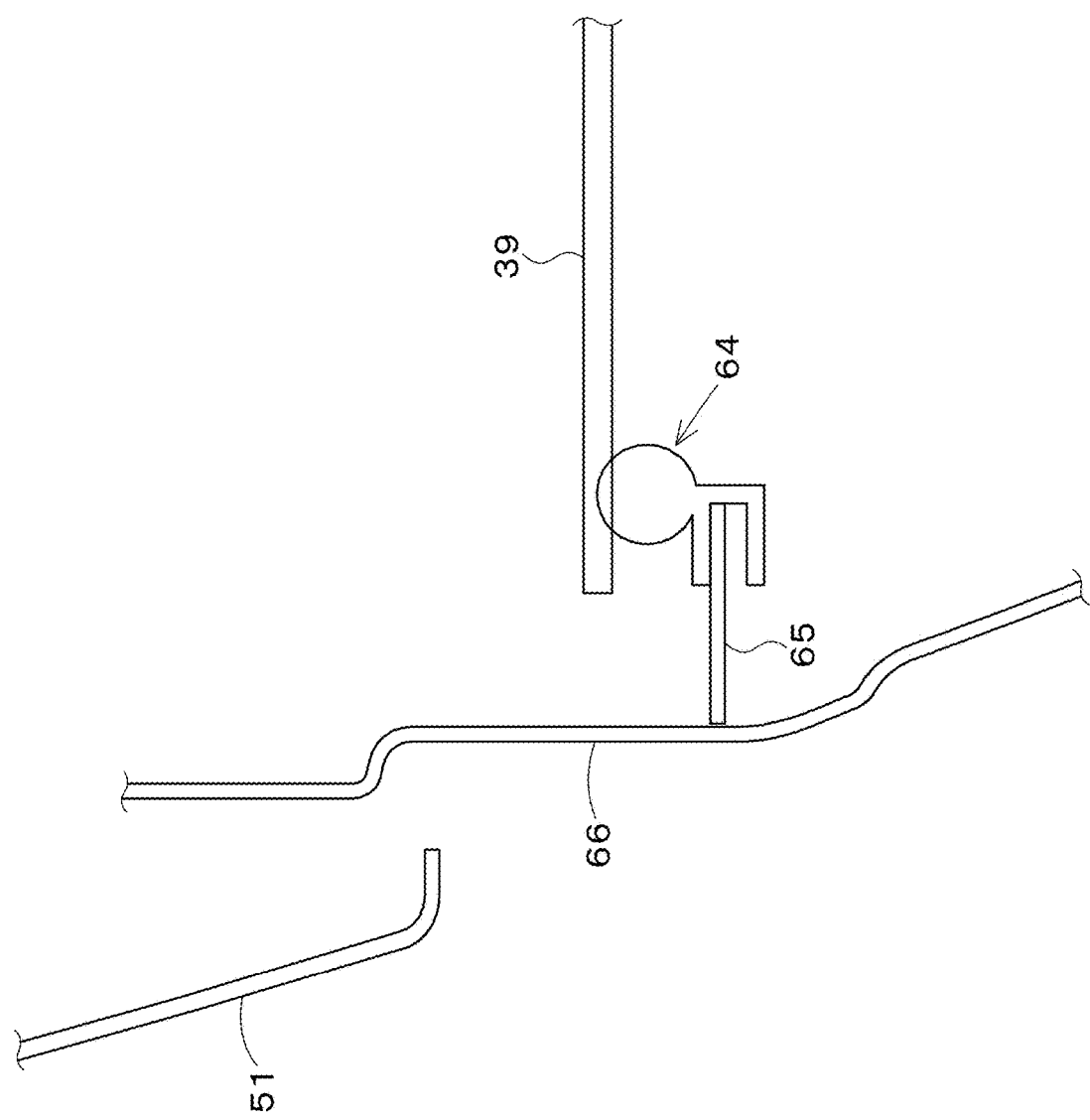
FIG. 9 is a sectional view as viewed in the direction of arrows Z1-Z1 in FIG. 8.

As illustrated in FIG. 8, a sealing member 64 is provided on a rear end of an upper portion of the partition plate 39 and an upper end of a rear portion thereof. The sealing member 64 and a covering plate 65, to which the sealing member 64 is attached, block the flow of air from the right side of the partition plate 39 to the prime mover room 52 at an area rearward of an upper portion of the partition plate 39. More specifically, as illustrated in FIGS. 1, 2, and 12, the hood 22 includes a rear side cover (covering member) 66 that covers the right, top, and rear of the cooling device(s). As illustrated in FIGS. 8, 9, and 12, the covering plate 65 for covering a gap between an inner surface of the rear side cover 66 and the partition plate 39 is fixed to the inner surface of the rear side cover 66. The sealing member 64 attached to the covering plate 65 comes into contact with the partition plate 39 from the right. A gap between the weight 20 and the partition plate 39 is appropriately sealed with a sealing member or a sealing structure.

As illustrated in FIG. 6, a space above a front portion of the partition plate 39 does not communicate with the prime mover room 52. Furthermore, the partition plate 39 includes a hole through which a routed member, such as a hose, a pipe, or a harness, extends. The hole with the routed member extending therethrough is closed with, for example, a grommet.

The shroud 57 is a resin member to guide a cooling air flow generated by the cooling fan. The shroud 57 is not limited to being made of resin. The shroud 57 may be made of, for example, a sheet of metal.

As illustrated in FIGS. 14 and 15, the shroud 57 includes a guard portion 57a surrounding the cooling fan 29, an intake portion 57b that is provided apart from the guard portion 57a and through which a cooling air flow is taken into the shroud 57, and an air guide portion 57c to guide the cooling air flow from the intake portion 57b to the guard portion 57a. The guard portion 57a is hollow and cylindrical, and has an inside diameter slightly larger than a rotation trajectory of the cooling fan 29. The intake portion 57b is located to the right of the guard portion 57a. A right end of the intake portion 57b is a rectangular opening that opens rightward. The intake portion 57b has an opening area greater than that of the guard portion 57a. The air guide portion 57c narrows from the intake portion 57b toward the guard portion 57a.

As illustrated in FIGS. 13, 14, and 15, the shroud 57 includes a mount wall portion 57d at which the shroud 57 is attached to the partition plate 39. The mount wall portion 57d protrudes from the intake portion 57b and extends along the edge of the opening 59.

The mount wall portion 57d is in contact with a portion around the opening 59 of the partition plate 39 on the opposite side (the cooling-device arrangement area) of the partition plate 39 from the prime mover 23 and is attached to the shroud mounting portions 58 on the opposite side. More specifically, the guard portion 57a and the air guide portion 57c are inserted into the opening 59 of the partition plate 39 from the right side of the partition plate 39, the mount wall portion 57d is brought into contact with a surface (right surface) of the partition plate 39 around the opening 59, and the mount wall portion 57d is attached to the shroud mounting portions 58 with bolts, so that the shroud 57 is fastened (attached) to the partition plate 39. In other words, the shroud mounting portions 58 are formed such that the shroud 57 extending through the opening 59 from the cooling-device arrangement area into the prime mover room 52 can be attached to the partition plate 39 from the cooling-device arrangement area.

As illustrated in FIG. 3, the cooling device unit 27 includes, in addition to the radiator (first cooler) 25 and the oil cooler (second cooler) 26, other cooling devices, such as a condenser (third cooler) 67, a fuel cooler (fourth cooler) 68, and a receiver (receiver tank) 69. The radiator 25 is a cooler to cool coolant for the prime mover 23. The oil cooler 26 is a cooler to cool hydraulic fluid that returns to the hydraulic fluid tank storing the hydraulic fluid (pressure oil). The condenser 67 is a cooler to cool and liquefy refrigerant that has turned into a semi-liquid state in a compressor 135 (see FIGS. 32 and 33). The fuel cooler 68 is a cooler to cool fuel (return fuel) returning from the prime mover 23 before the fuel is returned to the fuel tank. The receiver 69 is a device to separate the liquefied refrigerant from refrigerant that has not been liquefied in the condenser 67 and remove water and impurities from the refrigerant.

As illustrated in FIG. 14, each of the radiator 25 and the oil cooler 26 is provided such that its core portion faces in the machine-body width direction K2. The radiator 25 and the oil cooler 26 are arranged side by side in the front-rear direction K1 (machine-body front-rear direction). A sealing member 70 is interposed between the radiator 25 and the oil cooler 26. Furthermore, the radiator 25 and the oil cooler 26 are arranged to close the opening at the right end of the intake portion 57b of the shroud 57.

As illustrated in FIG. 3, the fuel cooler 68 and the condenser 67 are arranged to the right of the radiator 25 and the oil cooler 26. The fuel cooler 68 and the condenser 67 are cooled by a cooling air flow generated by the cooling fan 29. The receiver 69 is provided in front of the oil cooler 26.

As illustrated in FIG. 3, the cooling device unit 27 is provided outside (or to the right of) the partition plate 39 in the machine-body width direction K2. The cooling devices included in the cooling device unit 27 are fastened (attached) to the partition plate 39 on the right side of the partition plate 39 (opposite from the prime mover 23). In other words, the cooling devices are fastened, from the cooling-device arrangement area, to the partition plate 39 with the shroud 57 attached to the partition plate 39.

Figure 16:
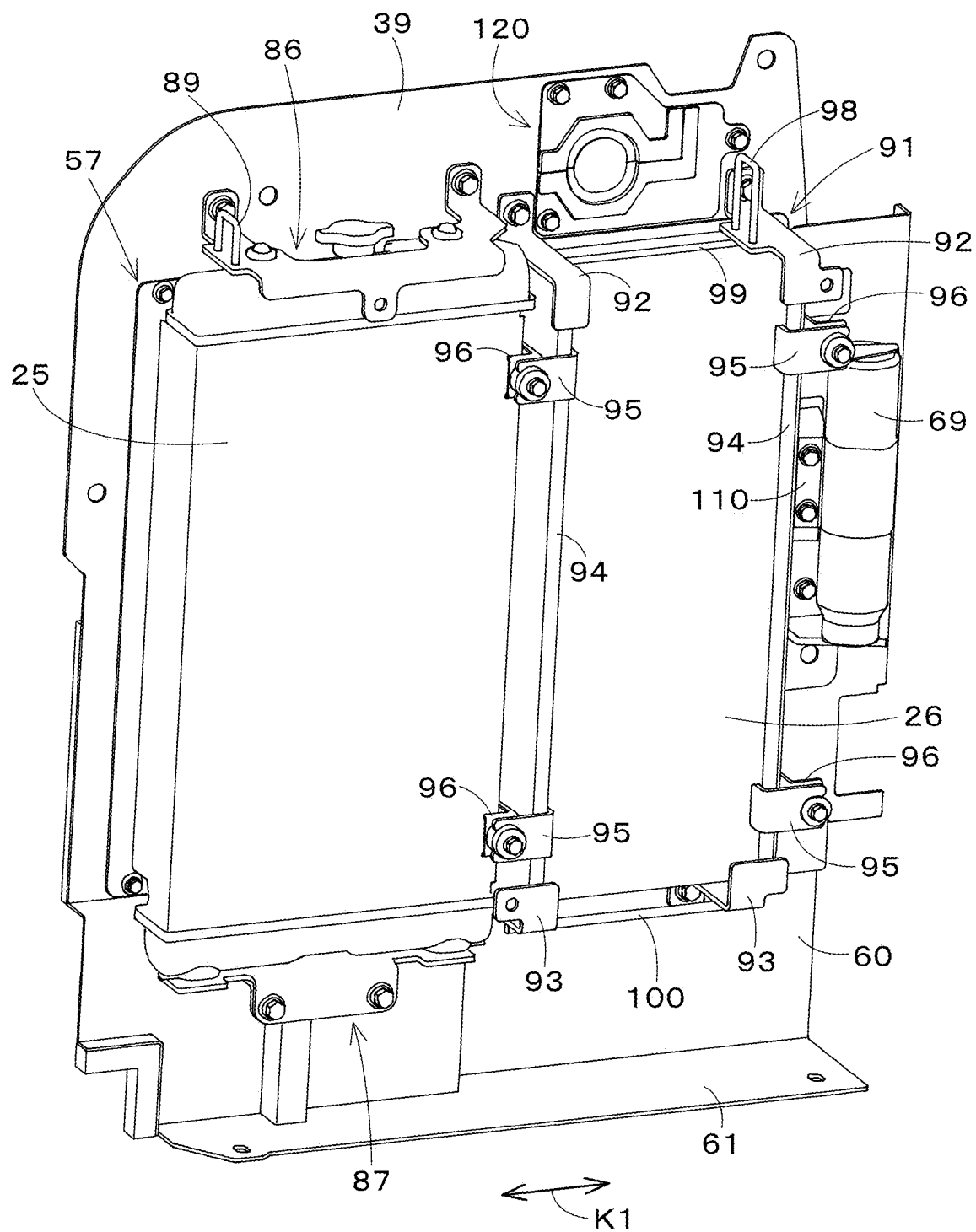
FIG. 16 is an assembly view illustrating the partition plate, a radiator, and an oil cooler.
Figure 17:
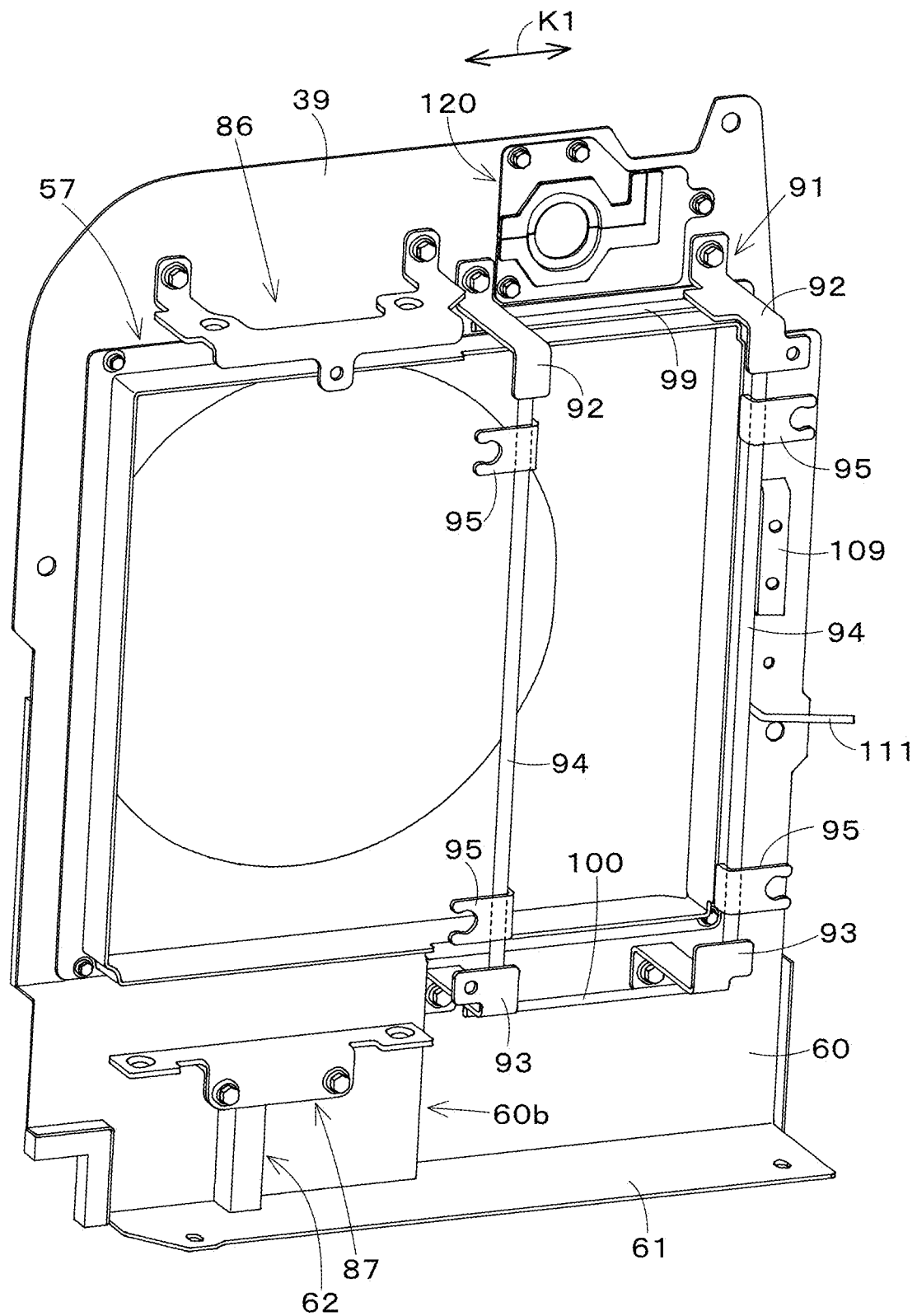
FIG. 17 is a perspective view illustrating a first bracket, a second bracket, and a third bracket.
Figure 18:
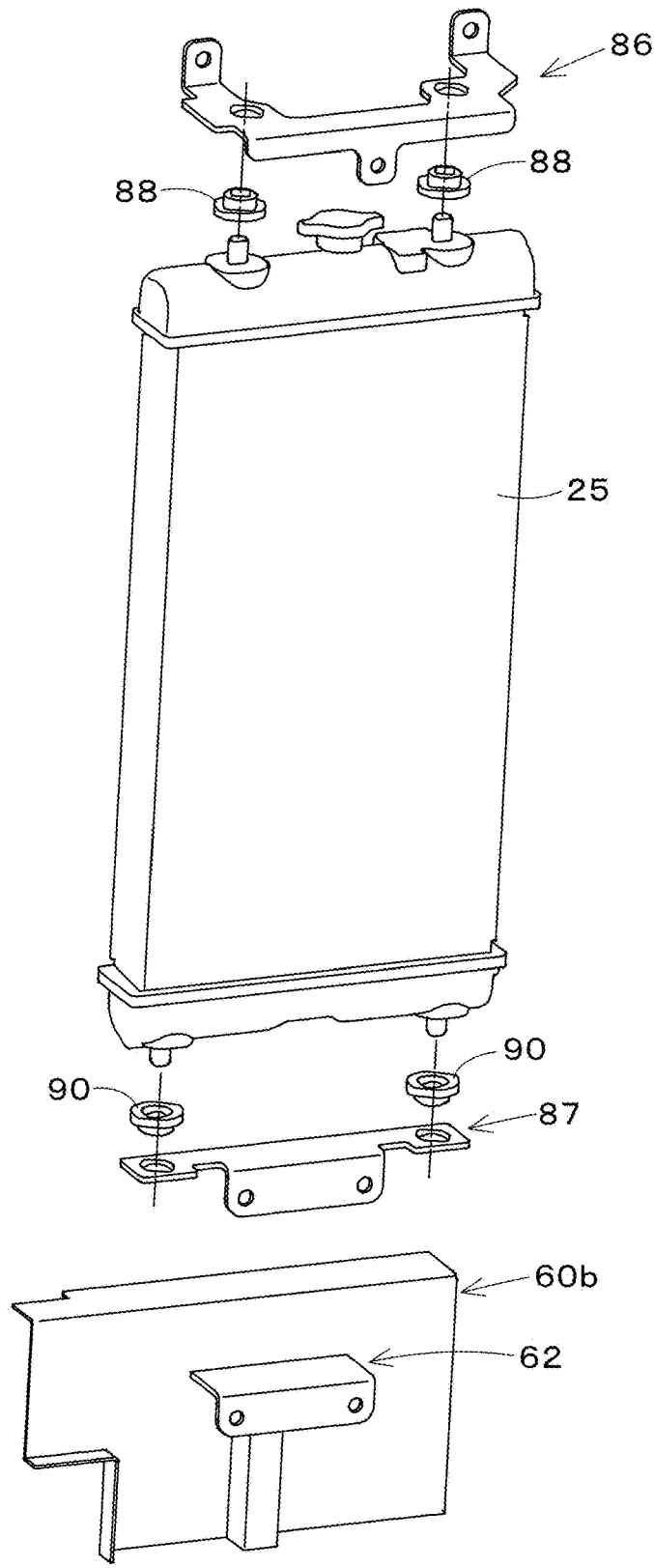
FIG. 18 is an exploded perspective view illustrating how to attach the radiator.

As illustrated in FIG. 16, the radiator 25 is attached to the partition plate 39 with a first bracket 86 and a second bracket 87. More specifically, the first bracket 86 is provided above the radiator 25. As illustrated in FIG. 17, the first bracket 86 is attached to the upper portion of the partition plate 39 by bolts. As illustrated in FIG. 18, the first bracket 86 supports an upper portion of the radiator 25 in a vibration-isolating manner via vibration isolators 88. As illustrated in FIG. 16, a lifting lug 89 is fixed to a rear portion of the first bracket 86.

As illustrated in FIG. 16, the second bracket 87 is provided below the radiator 25. As illustrated in FIGS. 17 and 18, the second bracket 87 is attached to the mounting member 62 provided on the bracket fixing portion 60b of the partition plate 39 by bolts. As illustrated in FIG. 18, the second bracket 87 supports a lower portion of the radiator 25 in a vibration-isolating manner via vibration isolators 90.

As illustrated in FIG. 16, the oil cooler 26 is attached to the partition plate 39 with a third bracket 91. As illustrated in FIG. 17, the third bracket 91 includes a pair of, or front and rear, upper stays 92 attached to the upper portion of the partition plate 39 by bolts, a pair of, or front and rear, lower stays 93 attached to the lower portion of the partition plate 39 by bolts, an upper coupling member 99 coupling the front and rear upper stays 92, a lower coupling member 100 coupling the front and rear lower stays 93, a pair of, or front and rear, coupling members 94 each coupling the upper stay 92 and the lower stay 93 at the same position in the front-rear direction K1, and multiple mounting stays 95. A pair of mounting stays 95 are provided for each of the coupling members 94.

Figure 19:
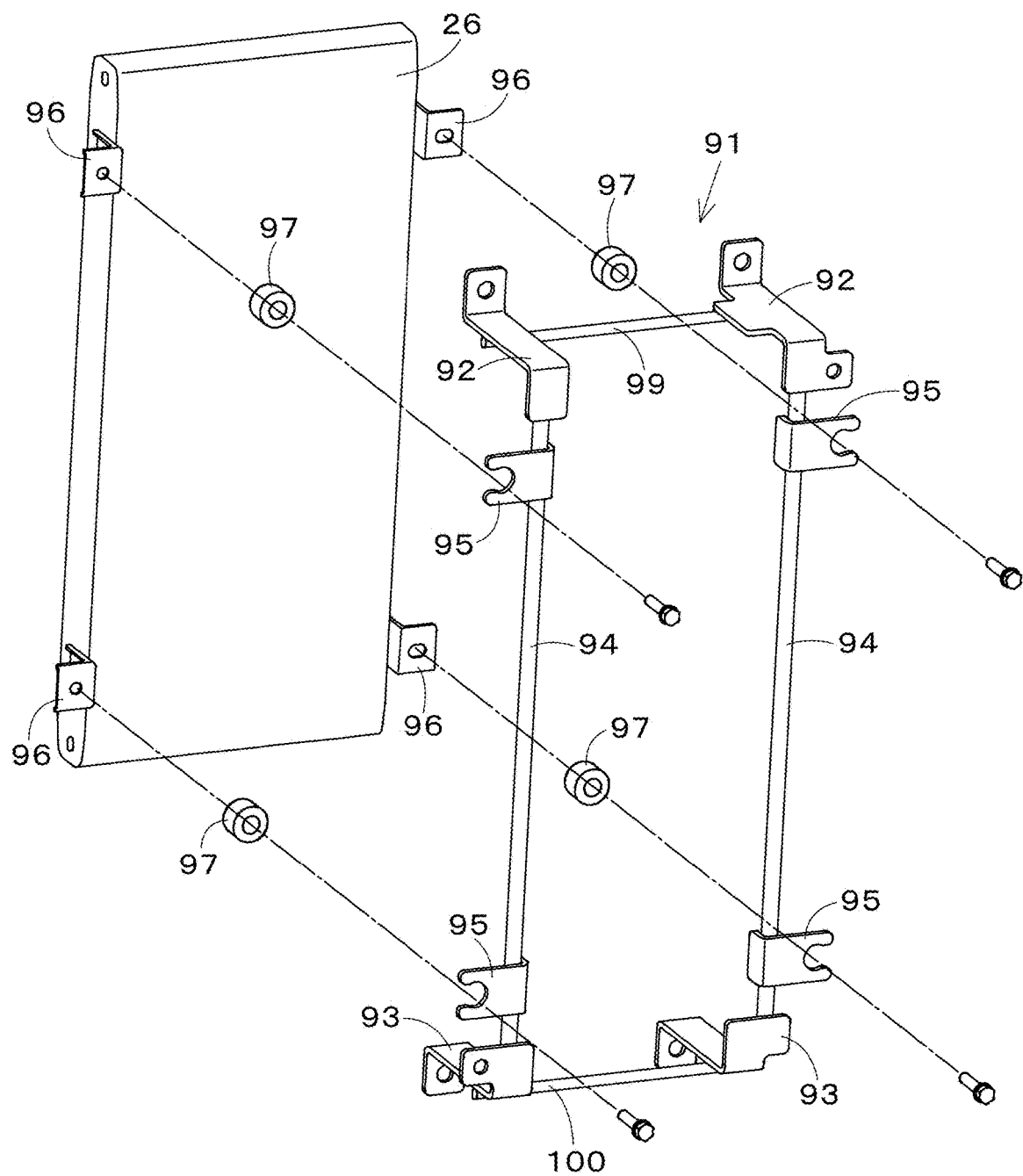
FIG. 19 is an exploded perspective view illustrating how to attach the oil cooler.

As illustrated in FIG. 19, the third bracket 91 is provided to the right of the oil cooler 26. The oil cooler 26 includes multiple retaining stays 96 corresponding to the multiple mounting stays 95. Each of the retaining stays 96 is attached to the respective one of the mounting stays 95 via a vibration isolator 97 by a bolt. A lifting lug 98 is fixed to the front upper stay 92. The position of each of the lifting lugs 89 and 98 and the number of lifting lugs are not limited to those described above. A lifting lug may be provided on at least one portion of an assembly 112 formed by fastening the shroud 57 and the cooling device unit 27 to the partition plate 39 so that the assembly 112 can be lifted as a single unit.

Figure 20:
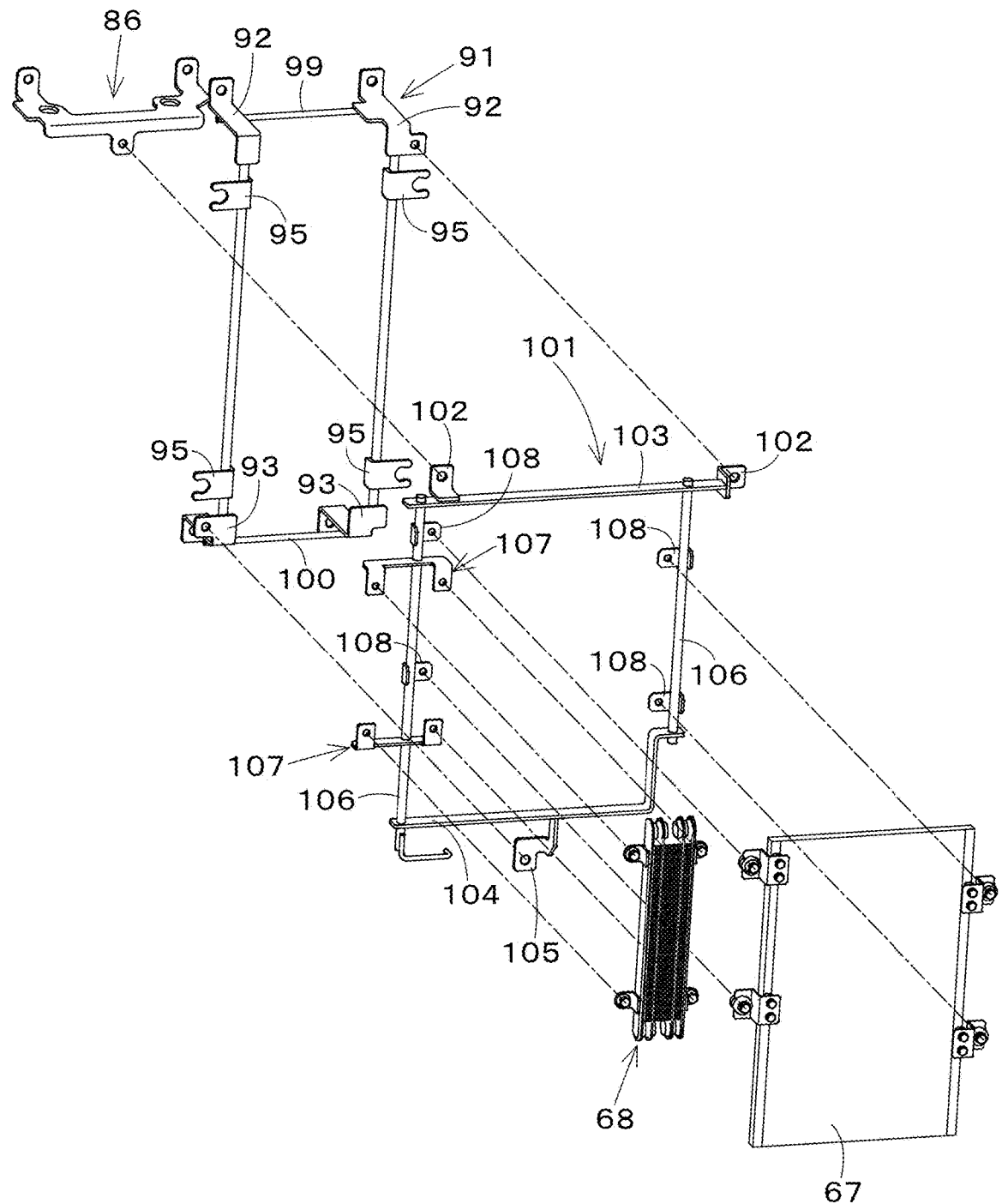
FIG. 20 is an exploded perspective view illustrating how to attach a fuel cooler and a condenser.

As illustrated in FIG. 20, the fuel cooler 68 and the condenser 67 are attached to the partition plate 39 with the first bracket 86, the third bracket 91, and a fourth bracket 101. The fourth bracket 101 includes a pair of, or front and rear, stay members 102, an upper member 103 that extends in the front-rear direction K1 and to which the pair of stay members 102 are fixed, a lower member 104 provided below and apart from the upper member 103, a stay member 105 attached to the lower member 104, a pair of, or front and rear, coupling rods 106 coupling the upper member 103 and the lower member 104, a pair of, or upper and lower, mounting stays 107 fixed to the rear coupling rod 106, and multiple mounting stays 108. A pair of mounting stays 108 are fixed to each of the coupling rods 106.

The front stay member 102 is attached to the front upper stay 92. The rear stay member 102 is attached to the first bracket 86. The stay member 105 is attached to the rear lower stay 93. The fuel cooler 68 is attached to the paired upper and lower mounting stays 107. The condenser 67 is attached to the multiple mounting stays 108.

Figure 21:
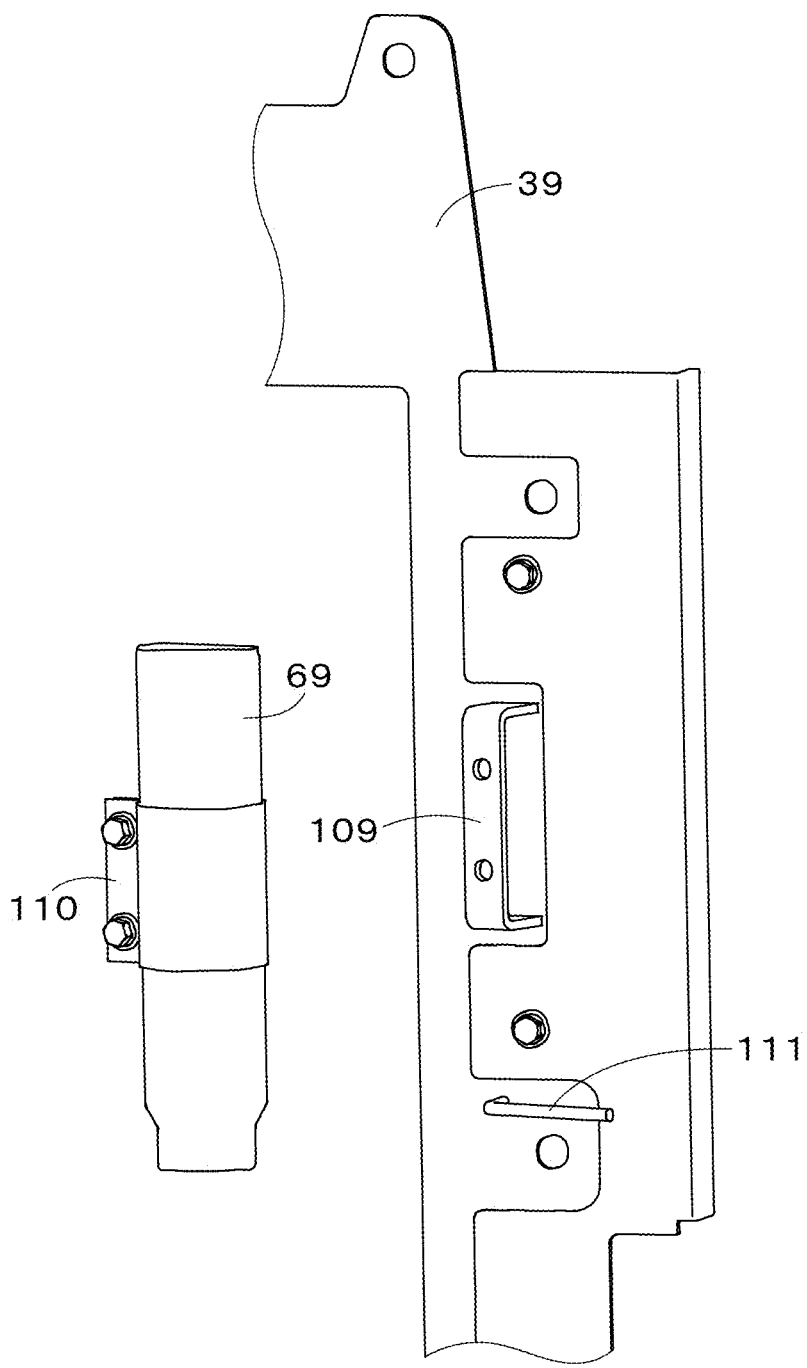
FIG. 21 is an exploded perspective view illustrating how to attach a receiver.

As illustrated in FIG. 21, the receiver 69 is attached to the partition plate 39 with a fifth bracket 109. The fifth bracket 109 is fixed to the partition plate 39 by welding. A mounting member 110 to be attached to the fifth bracket 109 by bolts is attached to the receiver 69. Furthermore, a bar 111 welded and fixed to the partition plate 39 is provided below the receiver 69. For example, to attach the receiver 69 to the fifth bracket 109, the receiver 69 can be placed on the bar. This facilitates attachment of the receiver 69 to the fifth bracket 109.

A front portion of the rear side cover 66 is supported by the swivel frame 19 via a hinge device. A rear portion of the rear side cover 66 is swingable about the front portion thereof in the machine-body width direction K2. Swinging the rear side cover 66 in the machine-body width direction K2 can open or close the cooling-device (cooling device unit 27) arrangement area 56 (refer to FIG. 12). Opening the rear side cover 66 allows access to the cooling devices included in the cooling device unit 27 (inspection of the cooling devices). The shroud 57 and each of the cooling devices are attachable and detachable to/from an outer side (right side) of the partition plate 39 in the machine-body width direction K2. This facilitates maintenance, replacement, and the like of the shroud 57 and each of the cooling devices.

Figure 22:
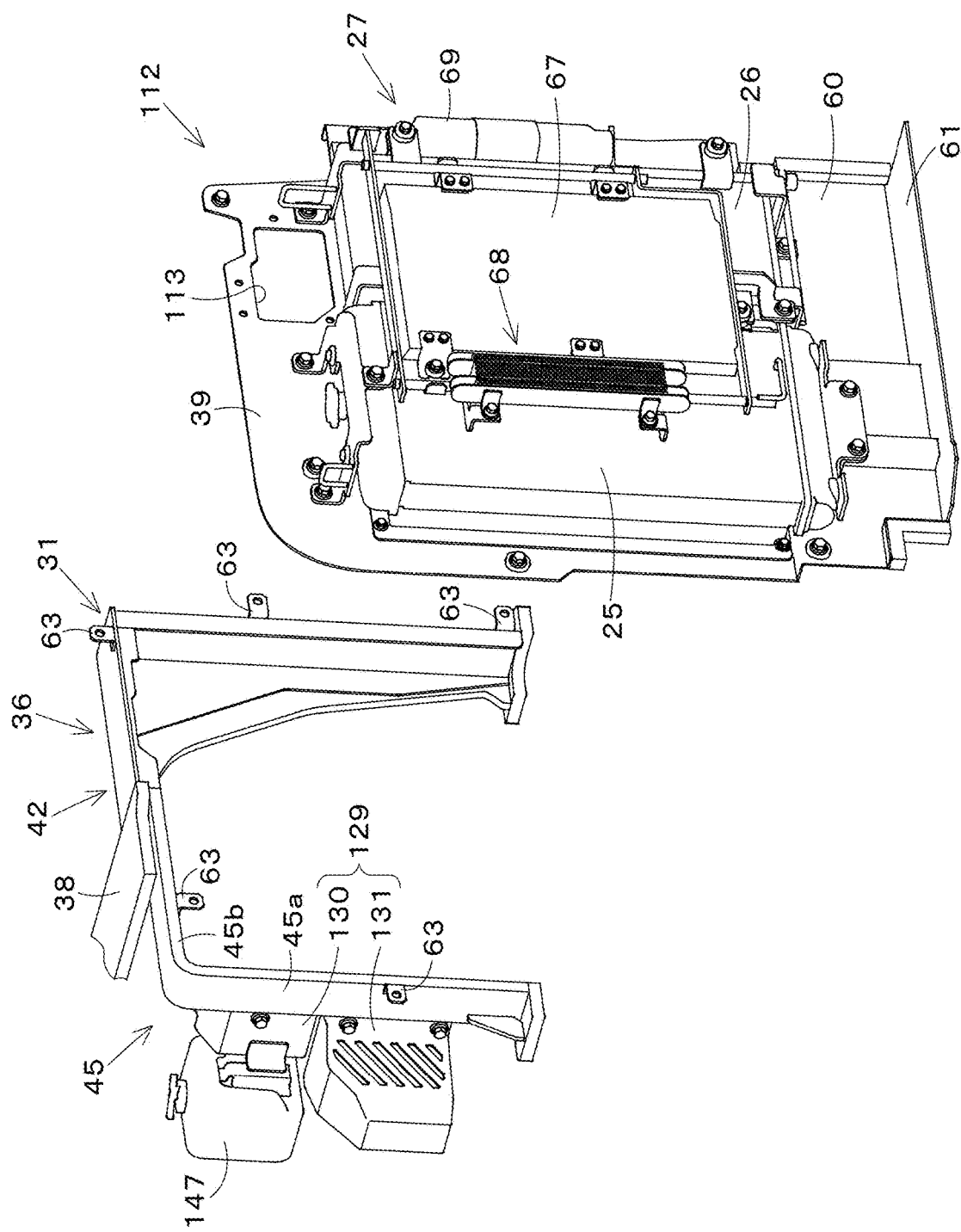
FIG. 22 is an exploded perspective view illustrating the support frame and an assembly formed by the partition plate, the shroud, and a cooling device unit.

As illustrated in FIG. 22, the shroud 57 and the cooling device unit 27 fastened to the partition plate 39 can be fastened to the swivel frame 19 (machine body 2). More specifically, the assembly 112, which is formed by fastening the shroud 57 and the cooling device unit 27 to the partition plate 39, is lifted with the above-described lifting lugs 89 and 98 by, for example, a crane, and is then lowered to a position close to the right of the support frame 31. The assembly 112 is placed on the swivel base plate 15. After that, the main plate portion 60 of the partition plate 39 is attached to the support frame 31, and the lower wall portion 61 is attached to the swivel base plate 15 (refer to FIG. 3).

As illustrated in FIG. 22, an upper front portion of the partition plate 39 has a hole 113 extending through the partition plate 39 in the machine-body width direction K2. The hole 113 is necessary to tighten a bolt 114 (refer to FIG. 23) and route a routed member 115 (refer to FIG. 24) through the hole 113 when the assembly 112 is mounted on the machine body 2.

Figure 23:
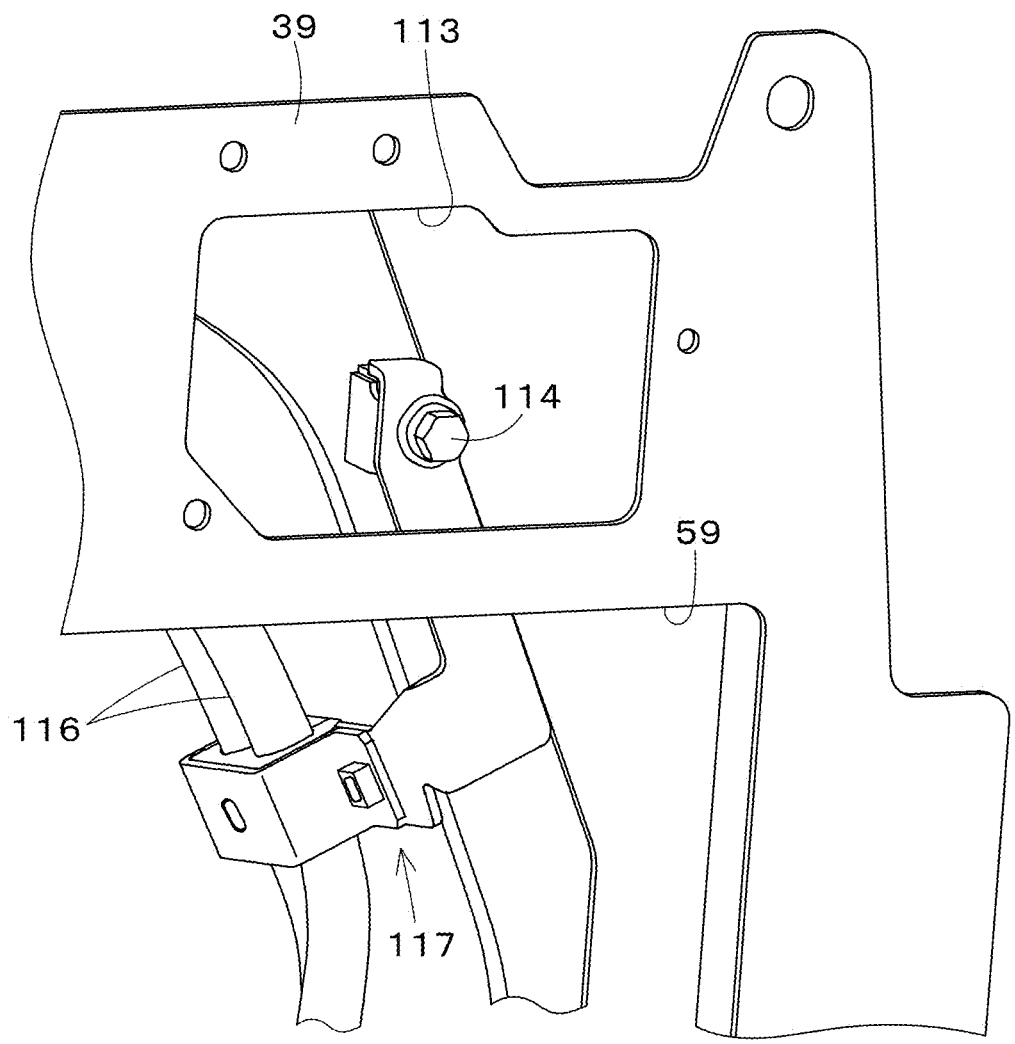
FIG. 23 is a perspective view illustrating a bolt seen through a hole in the partition plate.

More specifically, as illustrated in FIG. 23 in which a depiction of the shroud 57, the cooling device unit 27, and the like is omitted, the hole 113 allows the bolt 114 located to the left of the partition plate 39 to be tightened through the hole 113 from the right side of the partition plate 39 after the assembly 112 is fastened to the swivel frame 19. Examples of such a case include a case where the bolt 114 is tightened to attach a retainer 117 to the support frame 31. The retainer 117 retains air conditioner hoses 116 of an air conditioning system (air conditioner) installed in the working machine 1.

Figure 24:
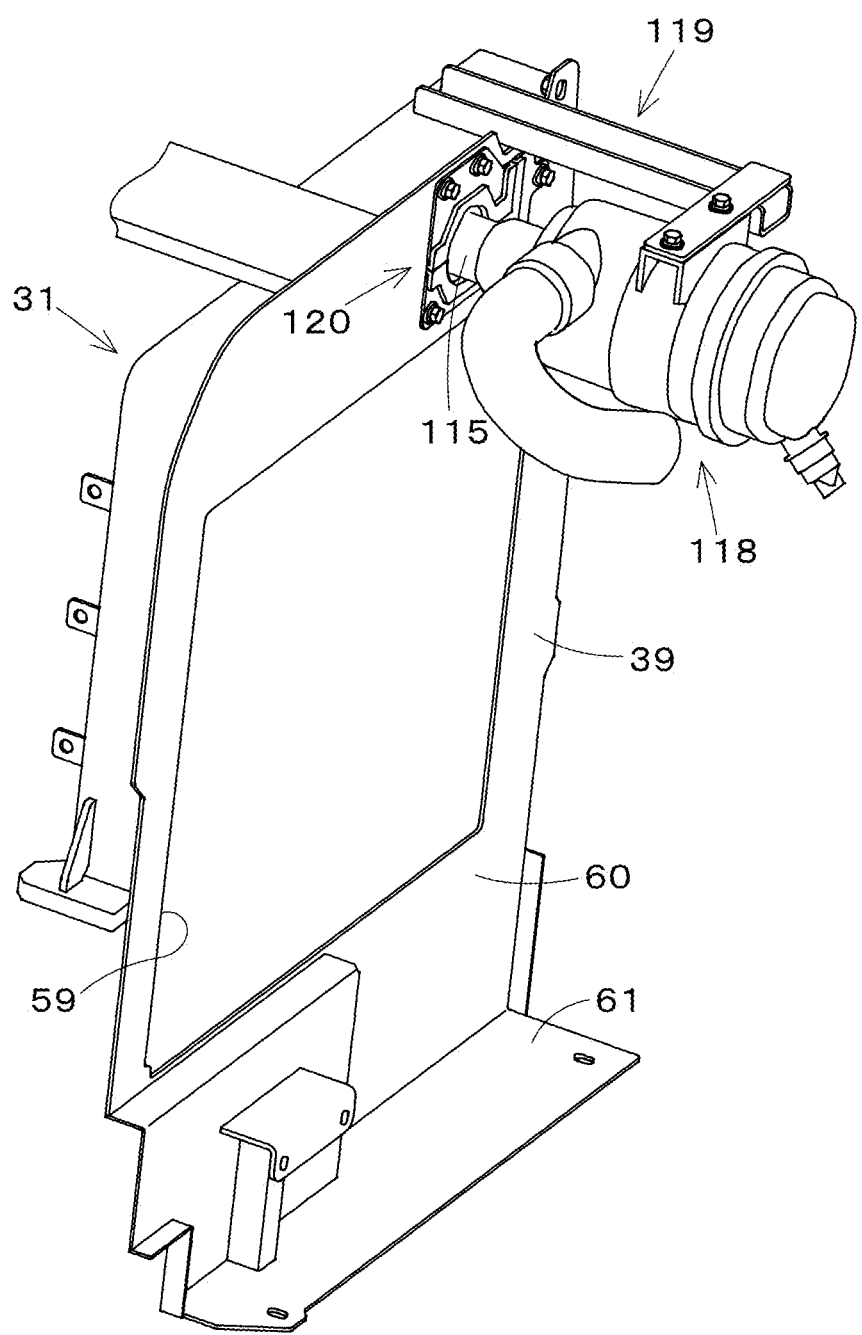
FIG. 24 is a perspective view illustrating a fastened state of an air cleaner.

Furthermore, as illustrated in FIG. 24 in which a depiction of the shroud 57, the cooling device unit 27, and the like is omitted, the hole 113 allows the routed member (duct member) 115 to be routed through the partition plate 39 in a direction from the left side (the prime mover 23 side) of the partition plate 39 to the right side thereof after the assembly 112 is fastened to the swivel frame 19. Examples of such a case include a case where the duct member 115 is connected to an air cleaner 118 through the hole 113. The air cleaner 118 cleans air to be supplied to the prime mover 23. The duct member 115 is used to guide the air from the air cleaner 118 to the prime mover 23.

After the partition plate 39 is attached to the support frame 31 and the swivel base plate 15, the air cleaner 118 is provided to the right of the partition plate 39 and is attached to a bracket 119 attached to the support frame 31. Therefore, the duct member 115 needs to be routed from the left side (the prime mover 23 side) of the partition plate 39 to the air cleaner 118 after the partition plate 39 is attached to the support frame 31 and the swivel base plate 15.

Figure 25:
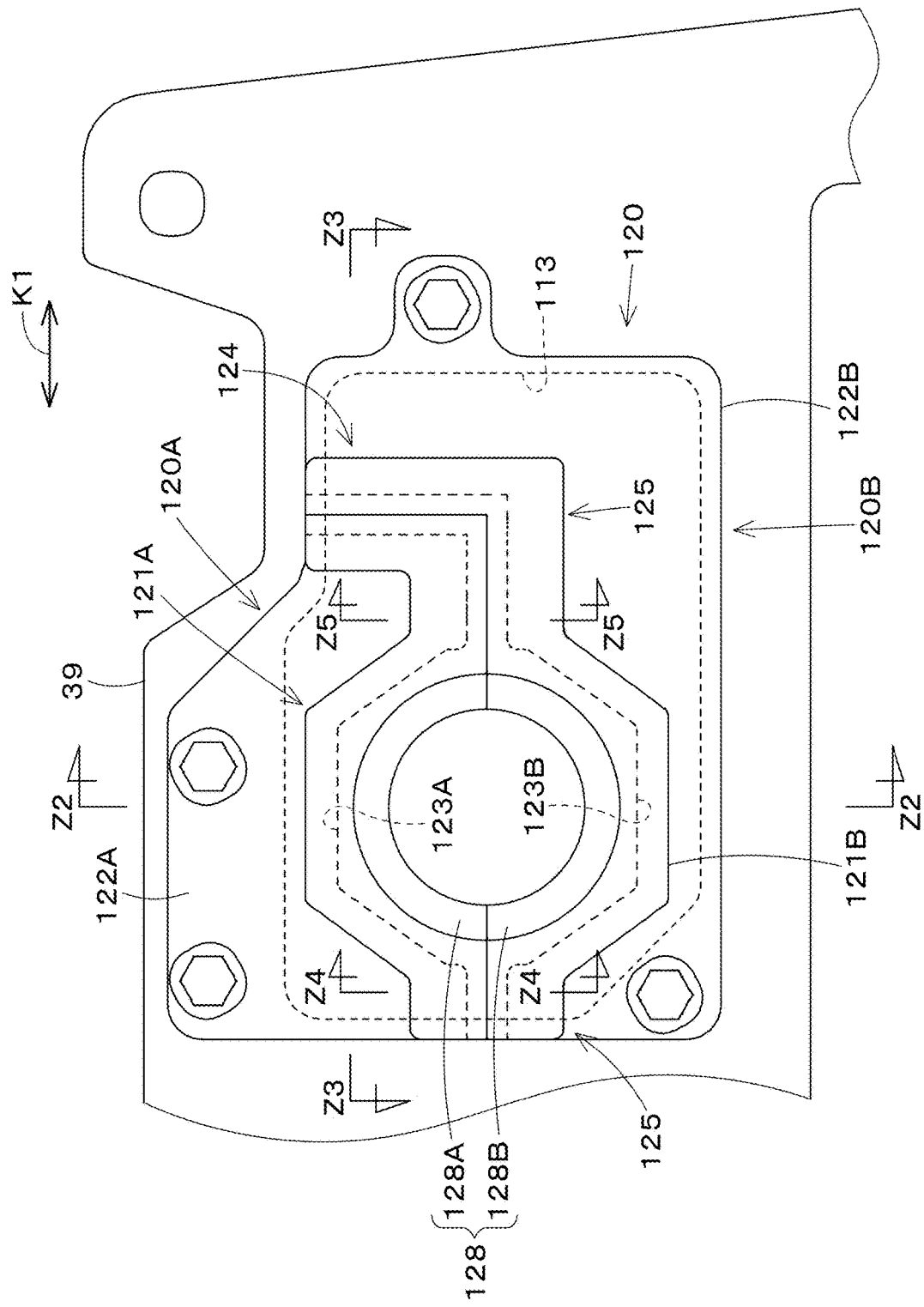
FIG. 25 is a side view from the right of a closing structure.

As illustrated in FIG. 25, a closing structure 120 is attached to the partition plate 39. After the bolt 114 is tightened and the duct member 115 is then routed, the closing structure 120 closes the hole 113 through which the duct member 115 extends. The closing structure 120 includes multiple sealing members 121A and 121B in tight contact with each other to provide sealing. The multiple sealing members 121A and 121B are in tight contact with each other in a direction along the plate surface of the partition plate 39.

The closing structure 120 will now be described in detail.

The closing structure 120 is a divided structure divided into sections. In the present example embodiment, the closing structure 120 is divided into two sections, a first section 120A and a second section 120B. This does not imply any limitation. The closing structure 120 may be divided into three or more sections.

Figure 26:
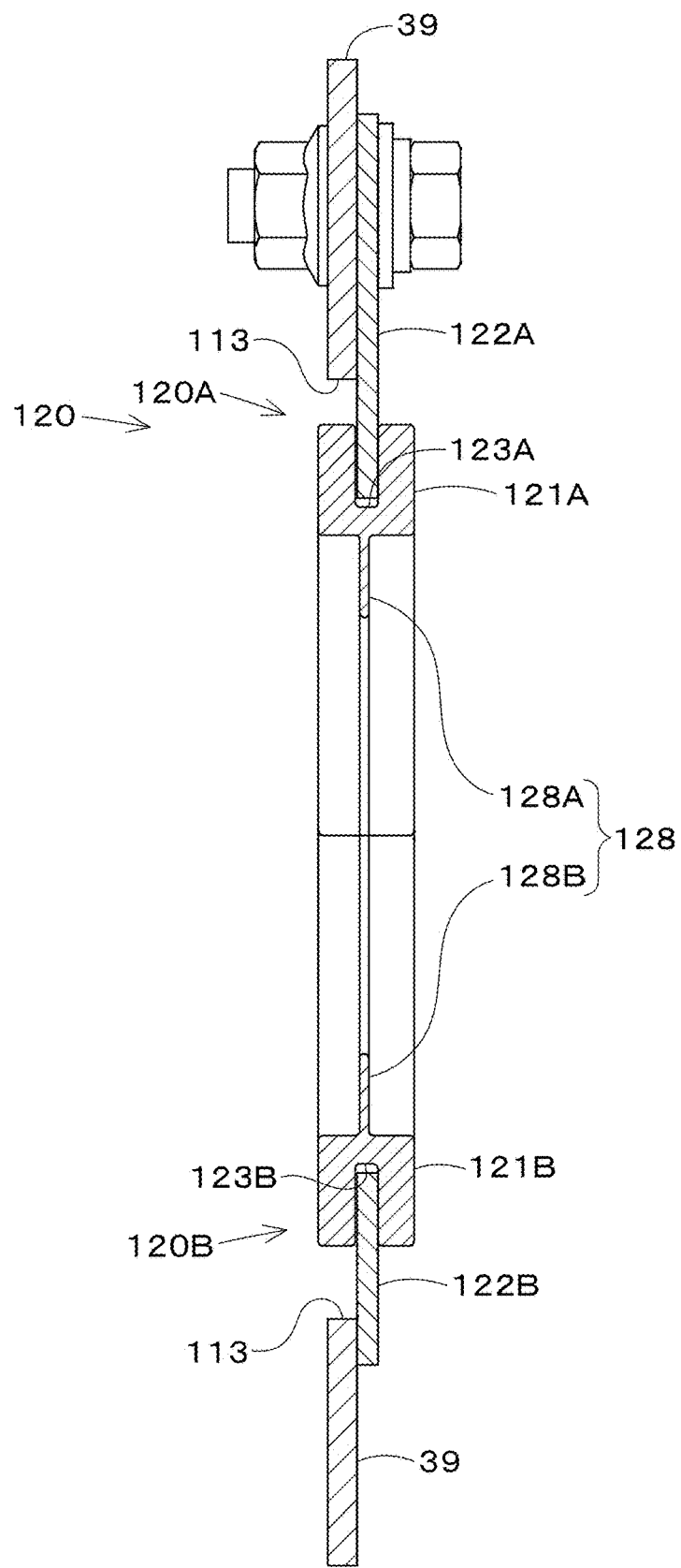
FIG. 26 is a sectional view as viewed in the direction of arrows Z2-Z2 in FIG. 25.
Figure 27:
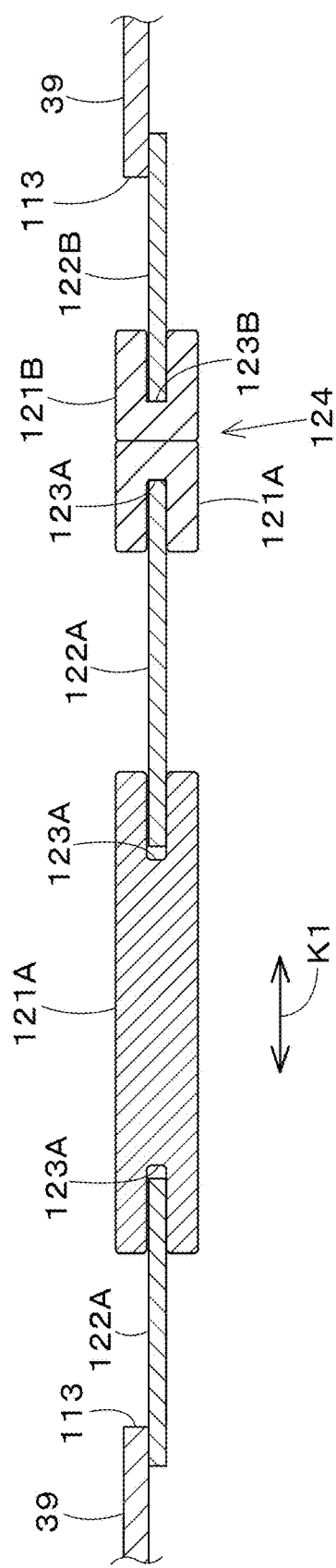
FIG. 27 is a sectional view as viewed in the direction of arrows Z3-Z3 in FIG. 25.
Figure 28:
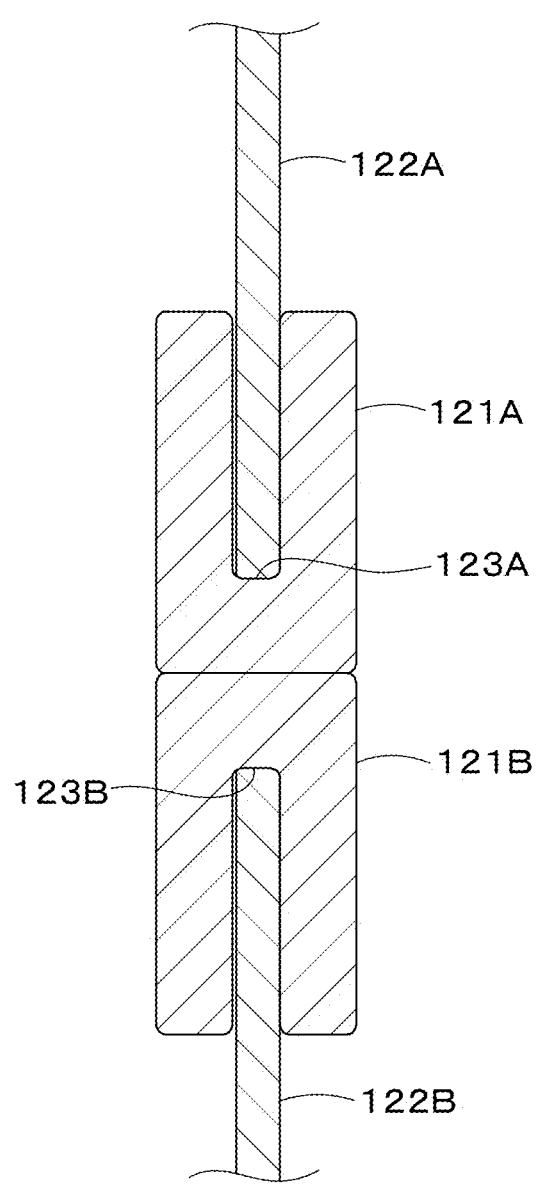
FIG. 28 is a sectional view as viewed in the direction of arrows Z4-Z4 or Z5-Z5 in FIG. 25.

As illustrated in FIG. 25, the first section 120A includes the first sealing member (sealing member) 121A and a first plate member 122A. As illustrated in FIGS. 26, 27, and 28, the first sealing member 121A has a groove 123A. The first sealing member 121A is attached to the first plate member 122A by inserting the first plate member 122A into the groove 123A. The first plate member 122A is attached to the partition plate 39 by, for example, bolts.

As illustrated in FIG. 25, the second section 120B includes the second sealing member (sealing member) 121B and a second plate member 122B. As illustrated in FIGS. 26, 27, and 28, the second sealing member 121B has a groove 123B. The second sealing member 121B is attached to the second plate member 122B by inserting the second plate member 122B into the groove 123B. The second plate member 122B is attached to the partition plate 39 by, for example, bolts.

The first plate member 122A and the second plate member 122B are formed from a metal plate material. The first sealing member 121A and the second sealing member 121B are formed from an elastic member, such as rubber.

As illustrated in FIGS. 27 and 28, the first sealing member 121A and the second sealing member 121B are butted against and brought into (tight) contact with each other, thus providing sealing between the first section 120A and the second section 120B. More specifically, as illustrated in FIGS. 25 and 27, front portions 124 of the first and second sealing members 121A and 121B that extend in the up-down direction are in contact with each other in the front-rear direction K1. Front/rear portions 125 of the first and second sealing members 121A and 121B that extend along the front-rear direction are in contact with each other in the up-down direction.

For the above-described closing structure 120, for example, the first section 120A is attached to the partition plate 39 with the duct member 115 extending through the hole 113. After that, the second section 120B is brought, from below, close to and into contact with the first section 120A and is then attached to the partition plate 39. Alternatively, the second section 120B is attached to the partition plate 39 with the duct member 115 extending through the hole 113. After that, the first section 120A is brought, from above, close to and into contact with the second section 120B and is then attached to the partition plate 39.

As illustrated in FIG. 25, the closing structure 120 includes a seal 128 located at substantially the middle thereof in the front-rear direction K1. The seal 128 is to be in contact with the periphery of the duct member 115 extending through the hole 113 and seal the periphery of the duct member 115.

The seal 128 includes a first section 128A as an upper portion and a second section 128B as a lower portion. The first section 128A extends integrally from the first sealing member 121A. The second section 128B extends integrally from the second sealing member 121B.

As illustrated in FIG. 26, the first section 128A and the second section 128B are thinner than the first sealing member 121A and the second sealing member 121B so that the first and second sections can absorb attachment errors and tolerances of the duct member 115 (or easily deform elastically).

Figure 29:
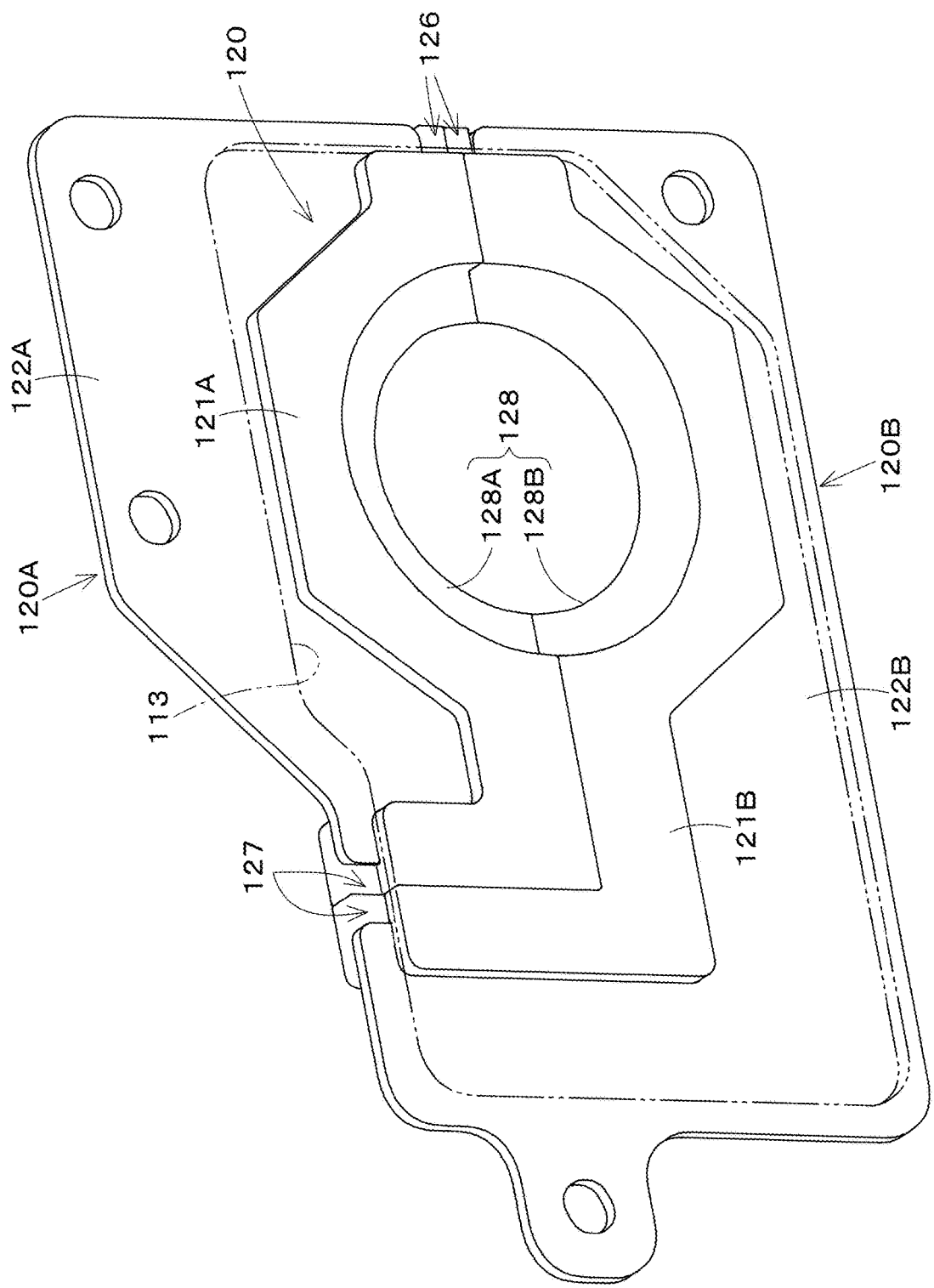
FIG. 29 is a perspective view from the left of the closing structure.

As illustrated in FIG. 29, an upper end of the front portion of the first sealing member 121A and an upper end of the front portion of the second sealing member 121B each have a cutout 127 so that the first plate member 122A and the second plate member 122B are in contact with the partition plate 39 on the left side of the closing structure 120. A rear end of the first sealing member 121A and a rear end of the second sealing member 121B also each have a cutout 126 so that the first plate member 122A and the second plate member 122B are in contact with the partition plate 39 on the left side of the closing structure 120.

Figure 30:
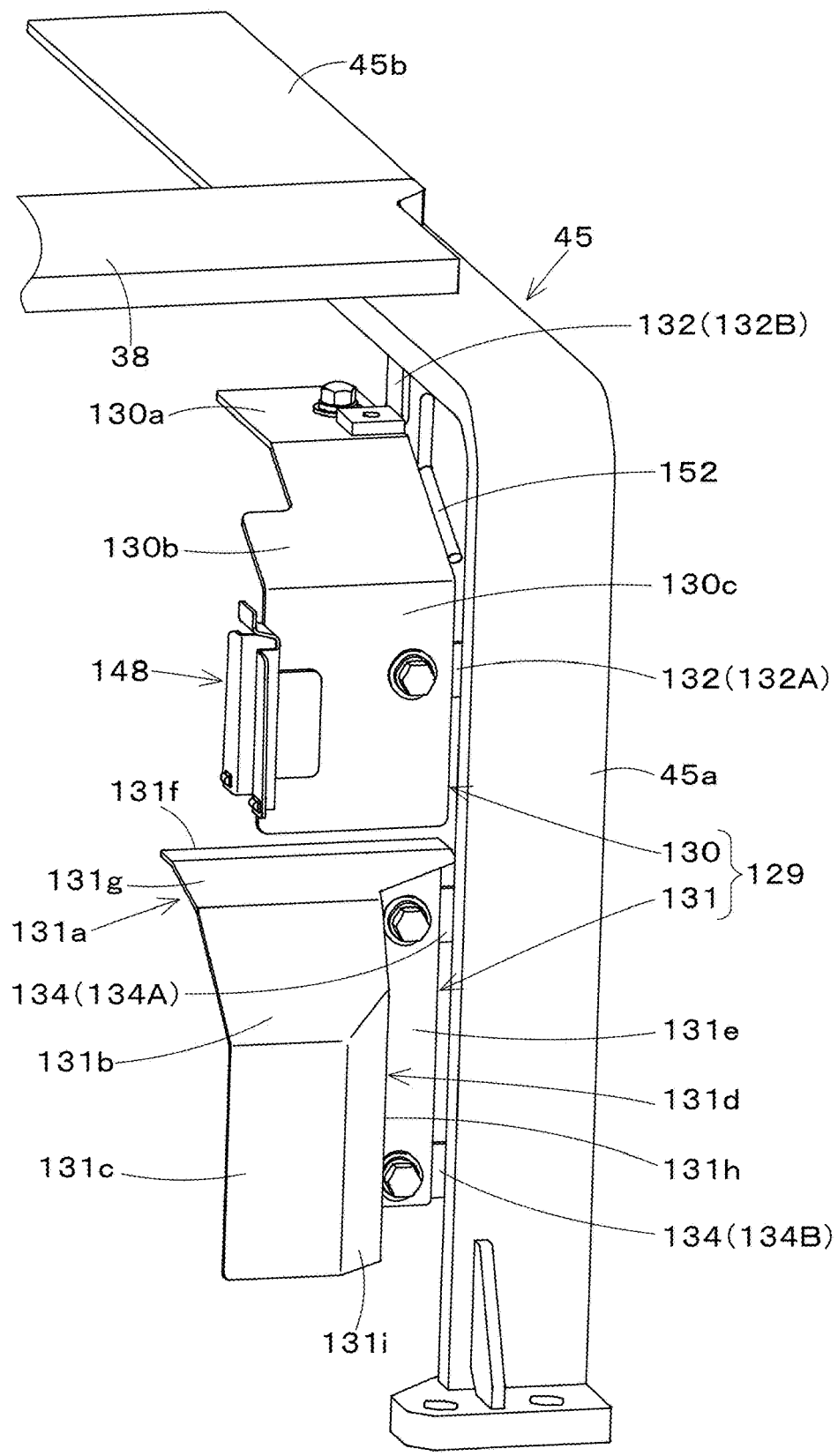
FIG. 30 is a perspective view illustrating an attached state of a fan cover.
Figure 31:
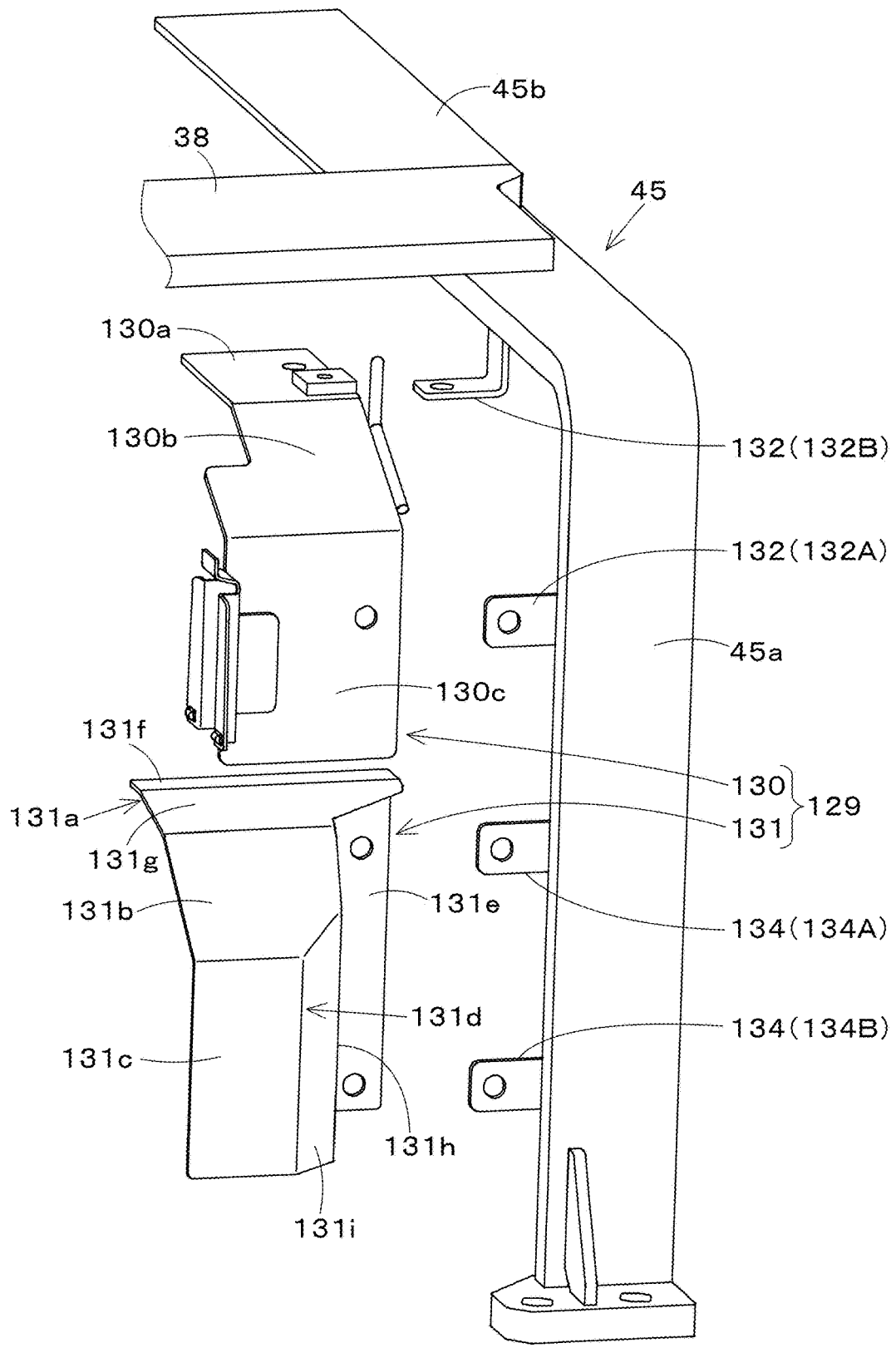
FIG. 31 is an exploded perspective view illustrating how to attach the fan cover.

As illustrated in FIG. 22, a fan cover 129 covering the cooling fan 29 is attached to the support frame 31. The fan cover 129 is formed from a plate material. As illustrated in FIG. 30, the fan cover 129 is provided beside (to the left of) the rear leg (leg portion) 45 of the support frame 31. As illustrated in FIGS. 30 and 31, the fan cover 129 includes a first cover 130 and a second cover 131 separate from the first cover 130. The second cover 131 is provided below the first cover 130.

Figure 34:
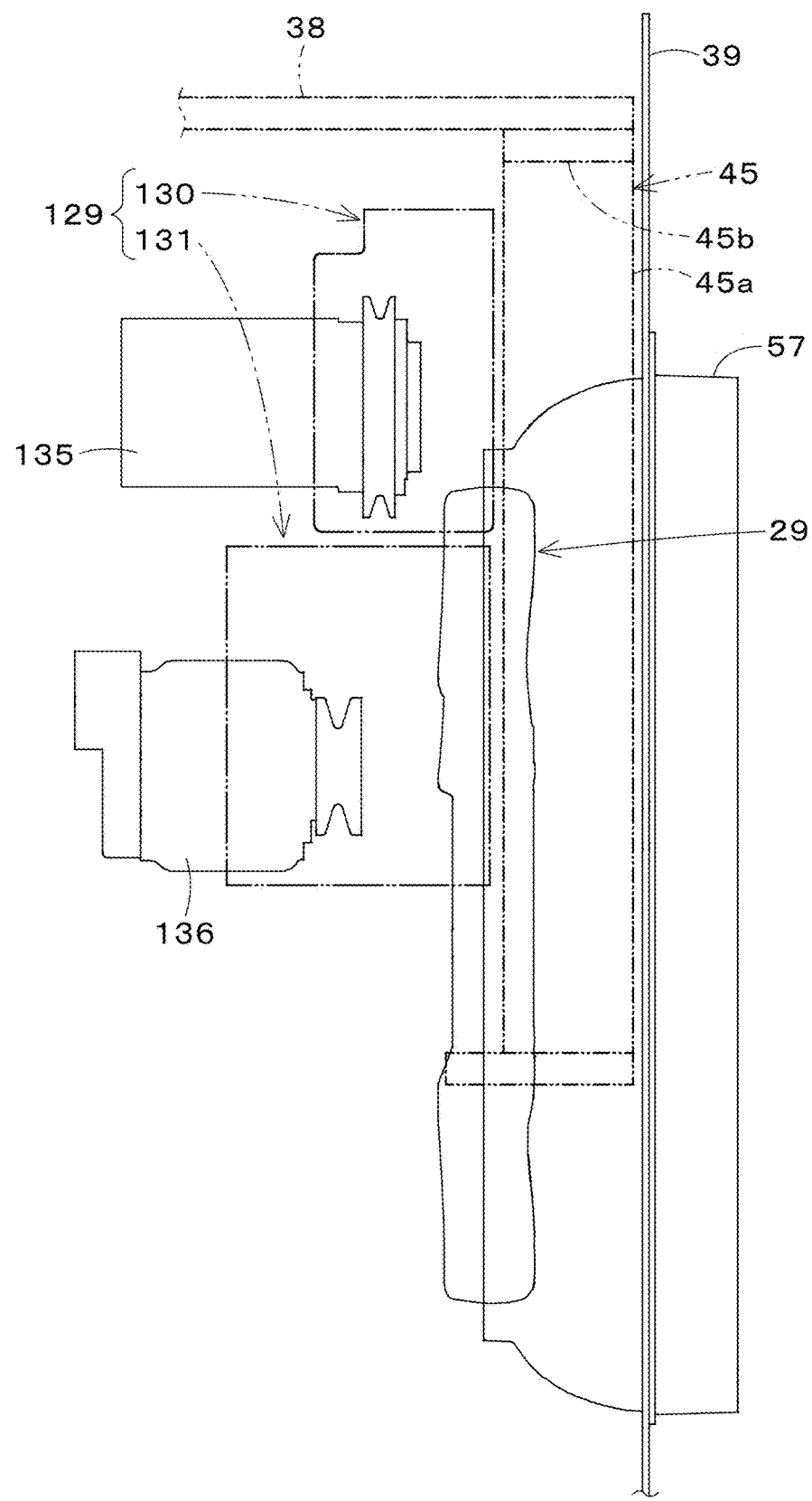

As illustrated in FIG. 34, the first section 45a of the rear leg 45 is located rearward of the cooling fan 29. The first cover 130 is provided to the left of an upper portion (the prime mover 23 side) of the first section 45a of the rear leg 45. The second cover 131 is provided to the left of a lower portion of the first section 45a of the rear leg 45.

Figure 32:
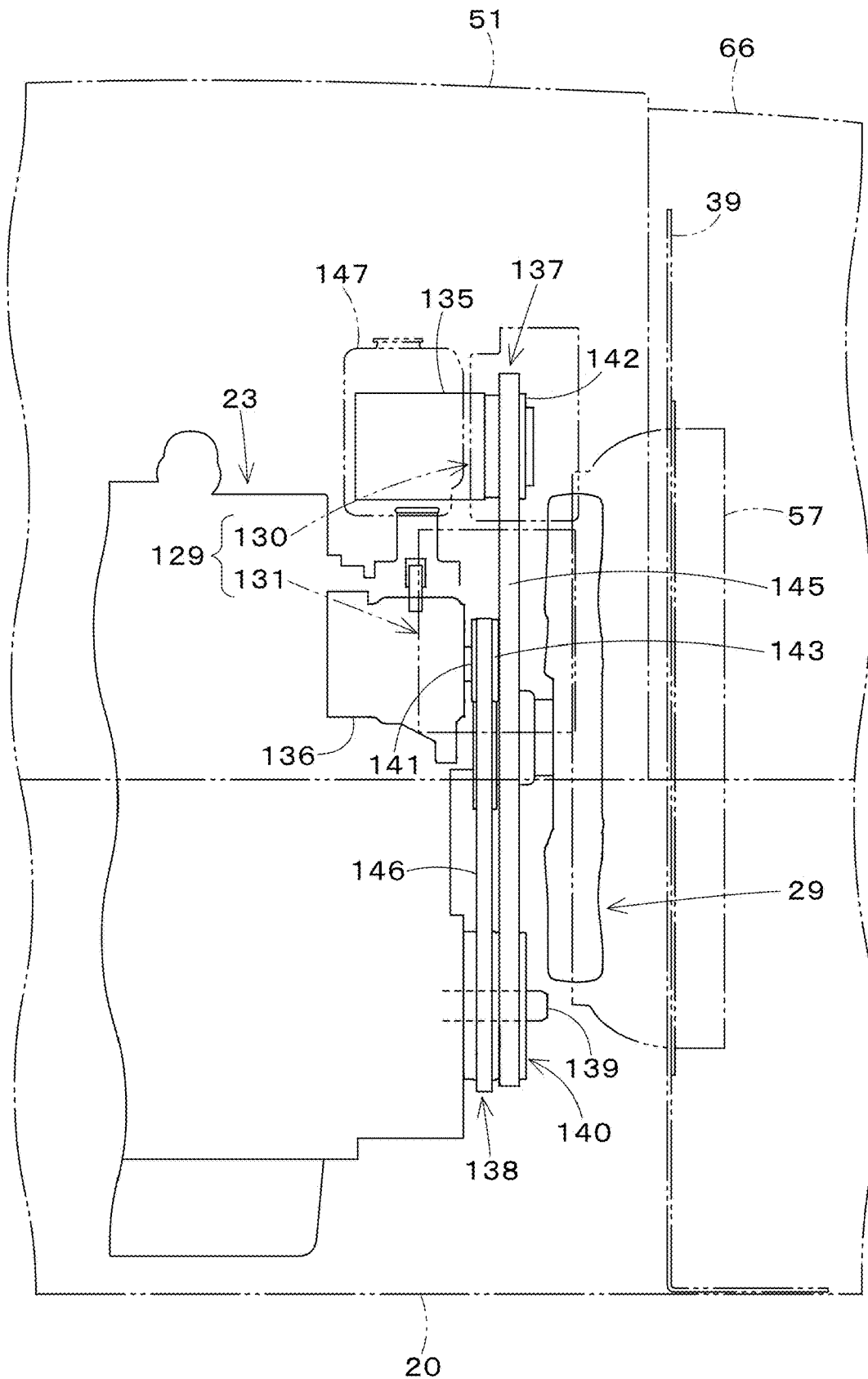
Figure 33:
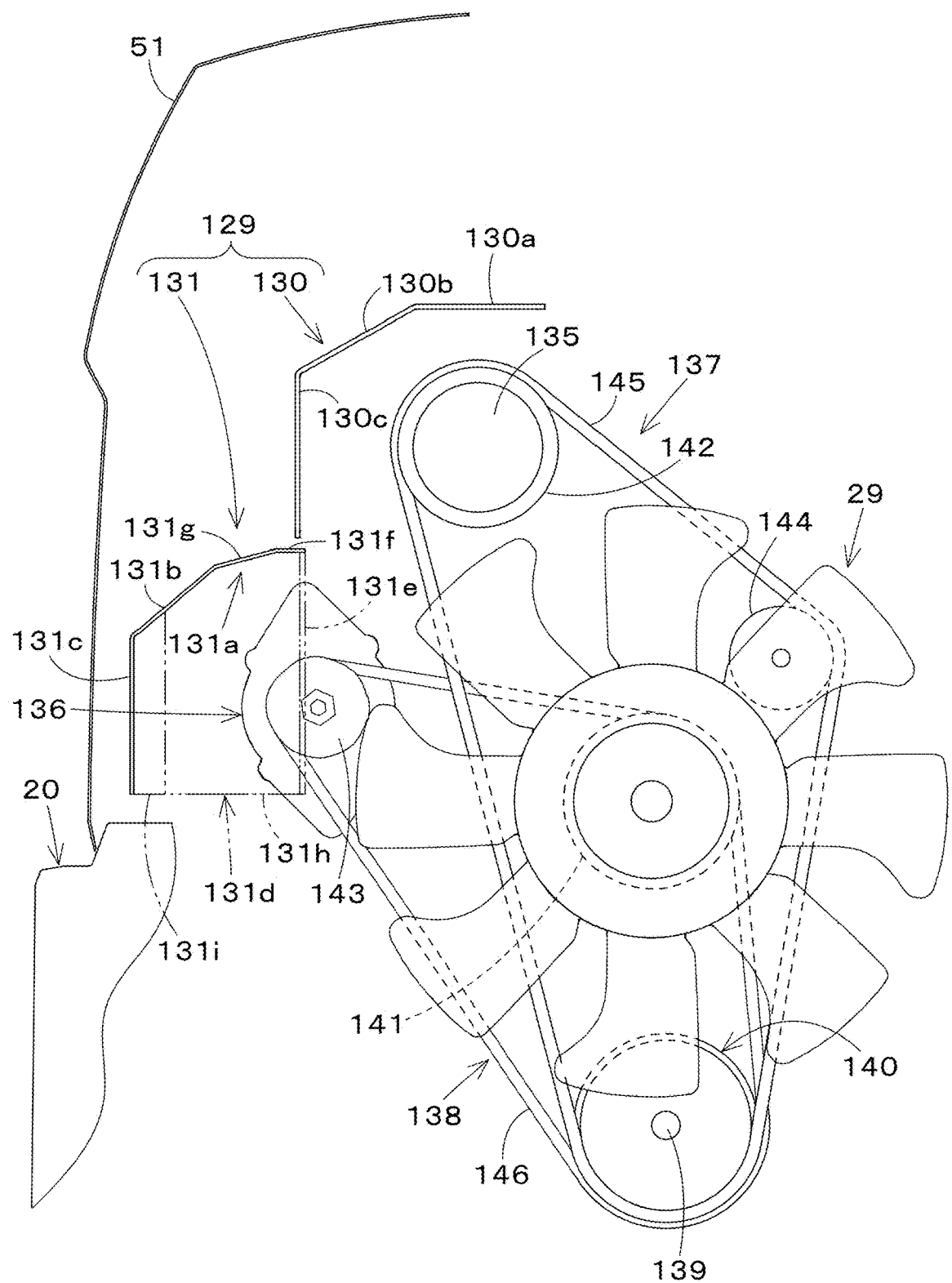

As illustrated in FIGS. 32 and 33, a right portion of the cooling fan 29 is inserted in the shroud 57. The first cover 130 covers, from above, the rear of a left portion of the cooling fan 29. Furthermore, the first cover 130 covers, from behind, a space above a rear portion of the cooling fan 29. The second cover 131 covers, from behind, the top of the left portion of the cooling fan 29. As illustrated in FIG. 32, the rear of a lower portion of the cooling fan 29 is covered by the weight 20.

As illustrated in FIGS. 30, 31, and 33, the first cover 130 includes an upper wall 130a, an intermediate wall 130b, and a rear wall 130c. The upper wall 130a has a plate surface facing in the up-down direction. The intermediate wall 130b extends rearward from a rear end of the upper wall 130a in an oblique direction in which the intermediate wall 130b shifts downward as it extends rearward. The intermediate wall 130b has a plate surface facing in a direction orthogonal to the oblique direction. The rear wall 130c extends downward from a lower end of the intermediate wall 130b. The rear wall 130c has a plate surface facing in the front-rear direction K1. The first cover 130 opens leftward (toward the prime mover 23).

The first cover 130 is attached to the upper portion of the first section 45a of the rear leg 45 and a rear portion of the second section 45b. More specifically, as illustrated in FIG. 31, stay members 132 are fixed to the upper portion of the first section 45a and the rear portion of the second section 45b. The stay member fixed to the first section 45a is referred to as a first stay member 132A. The stay member fixed to the second section 45b is referred to as a second stay member 132B. The rear wall 130c of the first cover 130 is attached to the first stay member 132A by, for example, a bolt. The upper wall 130a of the first cover 130 is attached to the second stay member 132B by, for example, a bolt.

Figure 35:
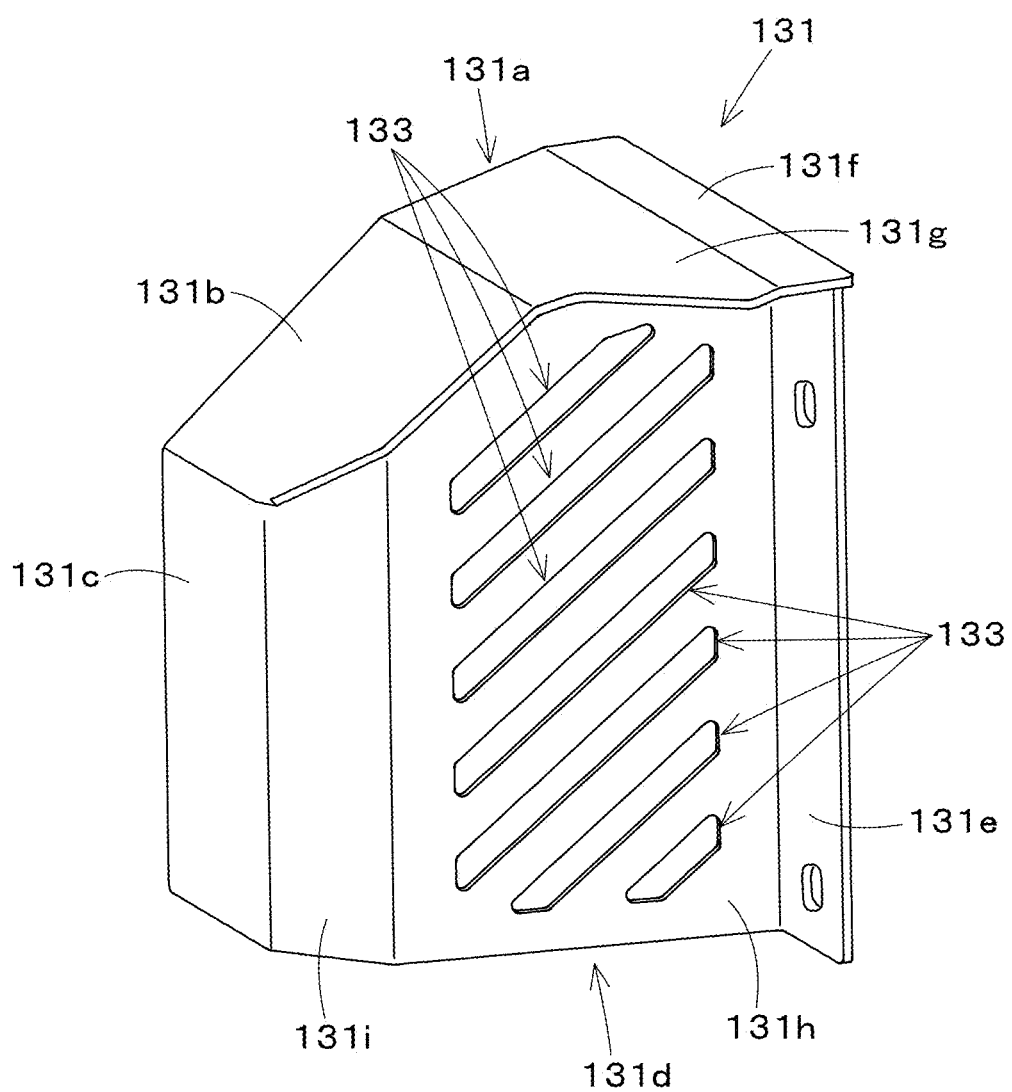
FIG. 35 is a perspective view from the right rear of a second cover.
Figure 36:
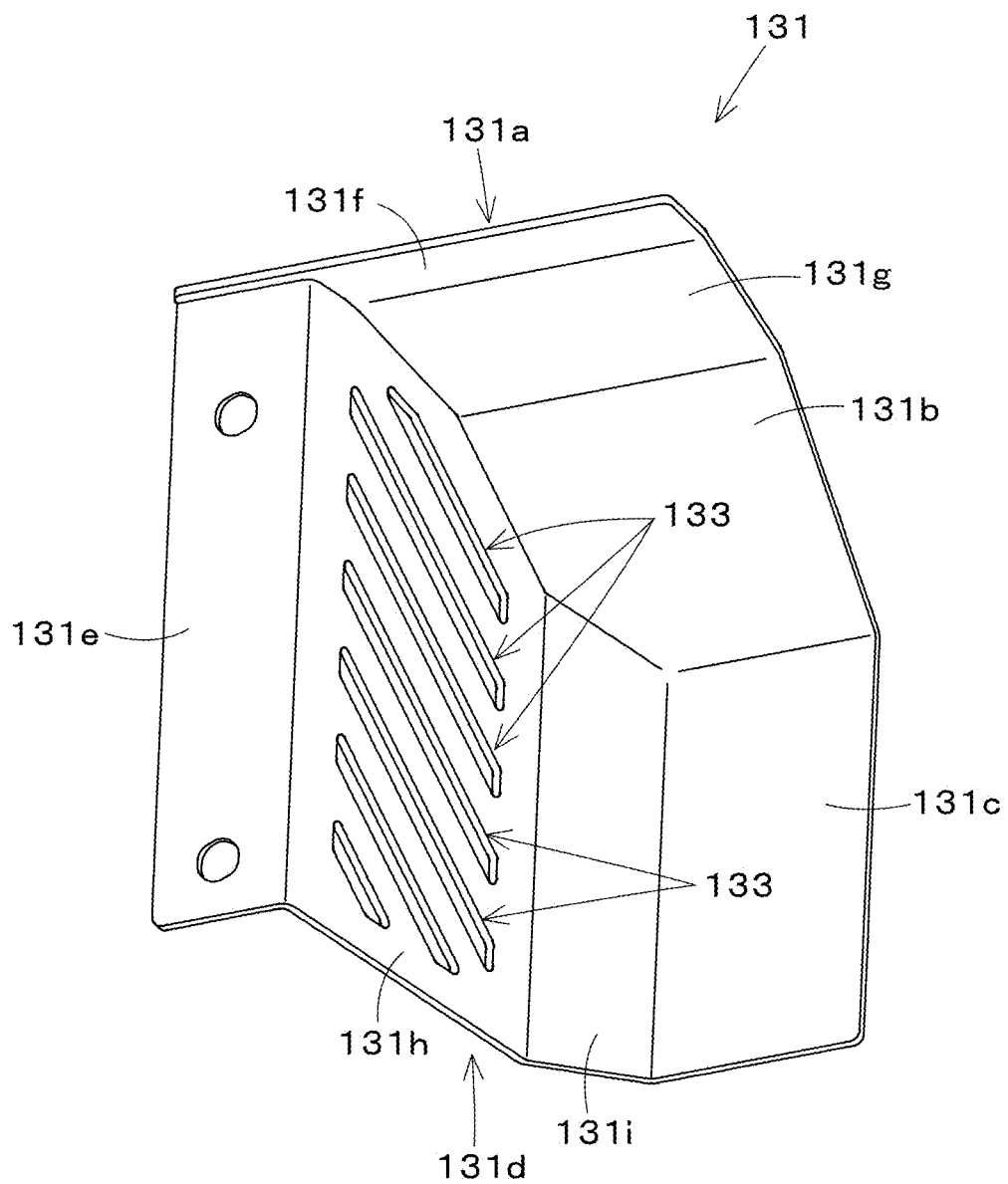
FIG. 36 is a perspective view from below of the second cover.

As illustrated in FIG. 33, the second cover 131 is provided rearward of the first cover 130 and is offset relative to (displaced from) the first cover 130. As illustrated in FIGS. 33, 35, and 36, the second cover 131 includes an upper wall 131a, an intermediate wall 131b, a rear wall 131c, a side wall 131d, and a front wall 131e.

The upper wall 131a includes a front portion 131f having a plate surface facing in the up-down direction and a rear portion 131g extending rearward from the front portion 131f in an oblique direction in which the rear portion 131g shifts downward as it extends rearward. The rear portion 131g has a plate surface facing in a direction orthogonal to the oblique direction.

The intermediate wall 131b extends rearward from a rear end of the upper wall 131a in an oblique direction in which the intermediate wall 131b shifts downward as it extends rearward. The intermediate wall 131b has a plate surface facing in a direction orthogonal to the oblique direction.

The rear wall 131c extends downward from a lower end of the intermediate wall 131b. The rear wall 131c has a plate surface facing in the front-rear direction K1.

The side wall 131d defines a right side of the second cover 131. The side wall 131d includes a first section 131h and a second section 131i. The first section 131h extends from a front end of the upper wall 131a to an intermediate portion of the intermediate wall 131b. The first section 131h has a plate surface facing in the machine-body width direction K2. The first section 131h has multiple air vents 133 extending therethrough. The second section 131i extends rearward from a rear end of the first section 131h in an oblique direction in which the second section 131i shifts leftward as it extends rearward. A rear end of the second section 131i is connected to a right end of the rear wall 131c. The second section 131i has a plate surface facing in a direction orthogonal to the oblique direction.

The front wall 131e extends rightward from a front end of the side wall 131d. The front wall 131e has a plate surface facing in the front-rear direction K1.

The second cover 131 opens leftward (toward the prime mover 23).

The second cover 131 is attached to the lower portion of the first section 45a of the rear leg 45. More specifically, as illustrated in FIG. 31, a pair of, or upper and lower, stay members 134 are attached to the lower portion of the first section 45a. The upper stay member is referred to as a third stay member 134A. The lower stay member is referred to as a fourth stay member 134B. An upper portion of the front wall 131e is attached to the third stay member 134A by, for example, a bolt. A lower portion of the front wall 131e is attached to the fourth stay member 134B by, for example, a bolt.

As illustrated in FIGS. 32 and 33, the compressor (first driven device) 135 and an alternator (second driven device) 136, which are driven by power from the prime mover 23, are arranged at the prime mover 23 adjacent to the cooling fan 29. The compressor 135, which is a device constituting a portion of the air conditioning system (air conditioner) installed in the working machine, compresses refrigerant (air conditioner gas) into a semi-liquid state. The alternator 136, which outputs DC power, can serve as a DC power supply and charge the battery 28.

As illustrated in FIGS. 32 and 33, the compressor 135 is provided to the left of the cooling fan 29. Furthermore, the compressor 135 is provided higher than the rear portion of the cooling fan 29. The alternator 136 is provided below and rearward of the compressor 135, and is offset relative to the compressor 135.

The first cover 130 is positioned to cover the compressor 135. The second cover 131 is positioned to cover the alternator 136.

The compressor 135 is driven by a first transmission mechanism 137. The alternator 136 is driven by a second transmission mechanism 138. The first transmission mechanism 137 and the second transmission mechanism 138 are configured as belt transmission mechanisms, for example.

As illustrated in FIG. 32, an output shaft 139 through which power is output from the prime mover 23 is provided in a lower right portion of the prime mover 23. As illustrated in FIGS. 32 and 33, a driving pulley 140 is attached to the output shaft 139 such that the driving pulley 140 is rotatable together with the output shaft 139. A fan pulley 141 that rotates together with the cooling fan 29 is provided above the driving pulley 140.

As illustrated in FIGS. 32 and 33, the first transmission mechanism 137 includes the driving pulley 140, a first transmission pulley 142, a guide pulley 144, and a first belt 145. The first transmission pulley 142 is provided obliquely rearward of and higher than the fan pulley 141. The first transmission pulley 142 is attached to a right side (input shaft) of the compressor 135. The guide pulley 144 is provided obliquely forward of and higher than the fan pulley 141. The first belt 145 has an endless shape, and is wound around the driving pulley 140, the first transmission pulley 142, and the guide pulley 144. The power of the prime mover 23 is transmitted from the driving pulley 140 to the first transmission pulley 142 via the first belt 145. The compressor 135 is driven by the first transmission pulley 142.

As illustrated in FIGS. 32 and 33, the second transmission mechanism 138 includes the driving pulley 140, the fan pulley 141, a second transmission pulley 143, and a second belt 146. The second transmission pulley 143 is provided rearward of the fan pulley 141. The second transmission pulley 143 is provided below and rearward of the first transmission pulley 142, and is offset relative to the first transmission pulley 142. Furthermore, the second transmission pulley 143 is offset relative to the first transmission pulley 142 in the machine-body width direction K2 (to the left). The second transmission pulley 143 is attached to a right side (input shaft) of the alternator 136. The second belt 146 has an endless shape, and is wound around the driving pulley 140, the second transmission pulley 143, and the fan pulley 141. The power of the prime mover 23 is transmitted from the driving pulley 140 to the second transmission pulley 143 via the second belt 146. The alternator 136 is driven by the second transmission pulley 143.

The first transmission pulley 142 is a first driving portion to drive the compressor (first driven device) 135 with power transmitted from the prime mover 23. The second transmission pulley 143 is a second driving portion to drive the alternator (second driven device) 136 with power transmitted from the prime mover 23.

As illustrated in FIGS. 33 and 34, the first cover 130 covers the first transmission pulley (first driving portion) 142. The second cover 131 covers the second transmission pulley (second driving portion) 143. The first cover 130, which opens toward the prime mover 23, does not need to cover the whole of the rear of the compressor 135. The first cover 130 can be made compact. The second cover 131, which opens toward the prime mover 23, does not need to cover the whole of the rear of the alternator 136. The second cover 131 can be made compact.

As described above, the first transmission pulley (first driving portion) 142 and the second transmission pulley (second driving portion) 143 are offset relative to each other in the up-down direction, the machine-body width direction K2, and the front-rear direction K1. If the cooling fan 29, the first transmission pulley 142, and the second transmission pulley 143 are covered by the fan cover 129 consisting of a single member, the fan cover 129 may have a complex shape. Since the fan cover 129 has a divided structure including the first cover 130 and the second cover 131, the shape of the fan cover 129 can be simplified without being complicated. In addition, this can prevent or reduce a decrease in yield. Furthermore, this can prevent or reduce bending of the fan cover 129 caused by vibration if the fan cover 129 covers an object or objects located in a wide area.

As illustrated in FIG. 34, the partition plate (plate member) 39 with the shroud 57 and the like (i.e., the shroud 57 and the cooling device unit 27) fastened thereto is attached to the support frame 31 such that the shroud 57 is inserted into the support frame 31 from the opposite side of the support frame 31 from the fan cover 129.

Figure 37:
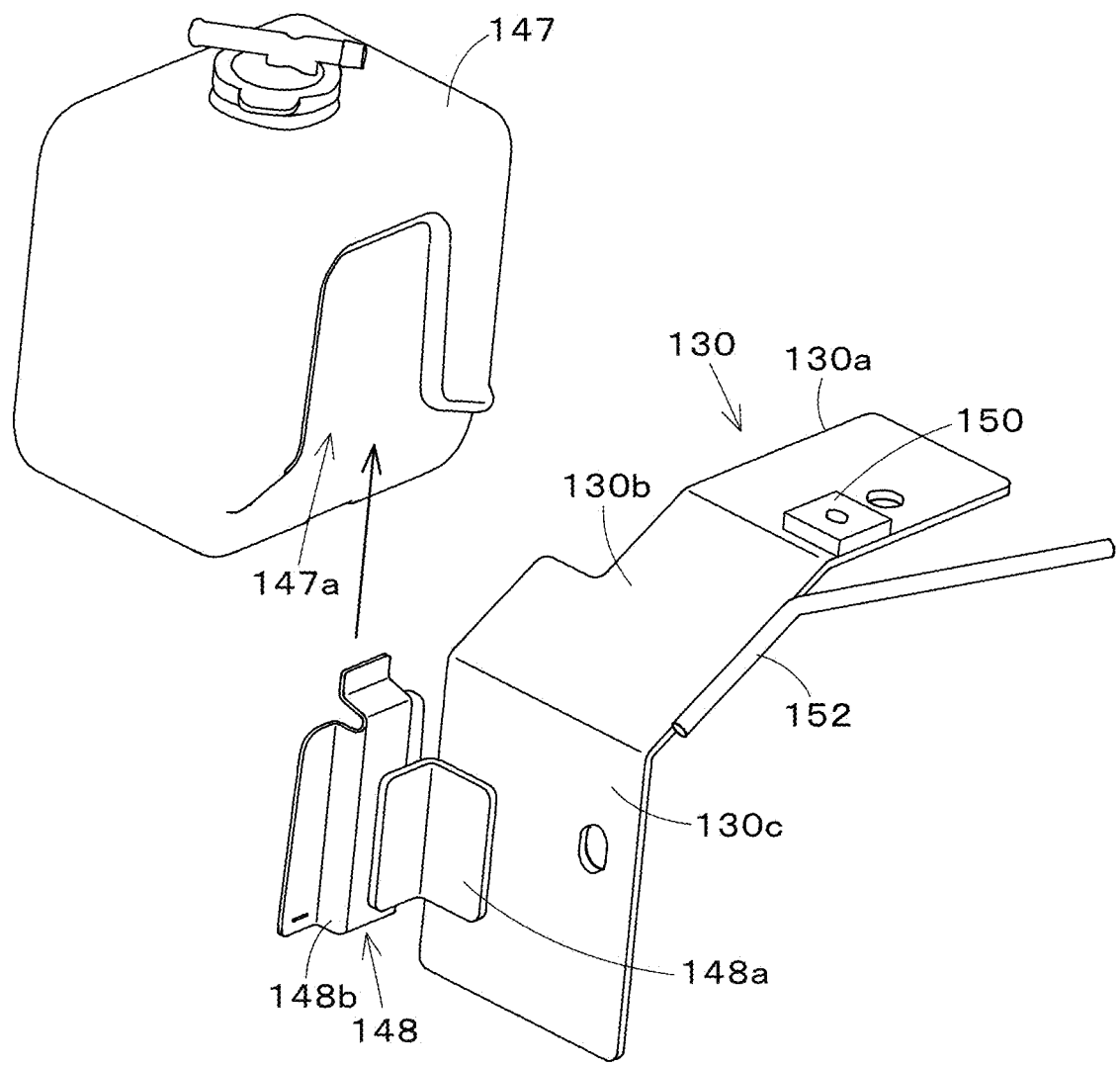
FIG. 37 is an exploded perspective view illustrating a first cover and a reserve tank.
Figure 38:
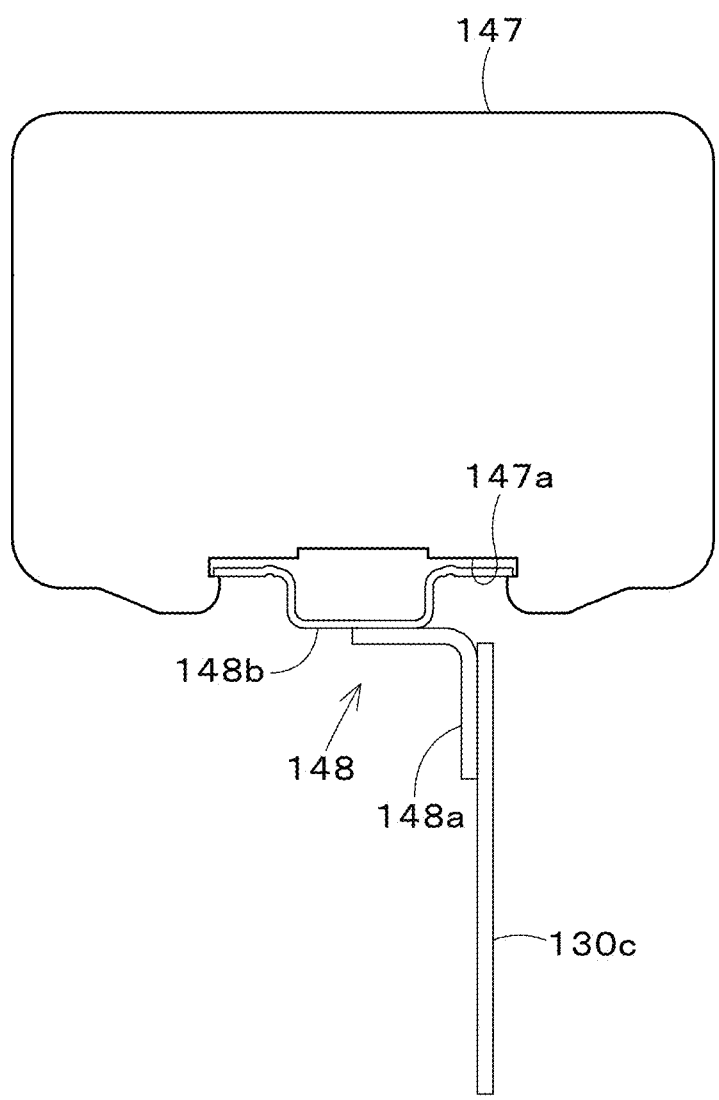
FIG. 38 is a top plan sectional view illustrating the reserve tank and a tank mounting member.

As illustrated in FIG. 37, the fan cover 129 includes a tank mounting member 148 to which a reserve tank 147 is attached. The reserve tank 147 stores the coolant for the radiator 25. As illustrated in FIGS. 37 and 38, the tank mounting member 148 is attached to the first cover 130. More specifically, the tank mounting member 148 includes a stay 148a fixed to the rear wall 130c of the first cover 130 and a fitting 148b fixed to the stay 148a. As illustrated in FIG. 38, the reserve tank 147 has an engagement recess 147a in which the fitting 148b is fitted. The reserve tank 147 is moved from above downward so that the fitting 148b is fitted into the engagement recess 147a, and is thus attached to the tank mounting member 148.

Figure 39:
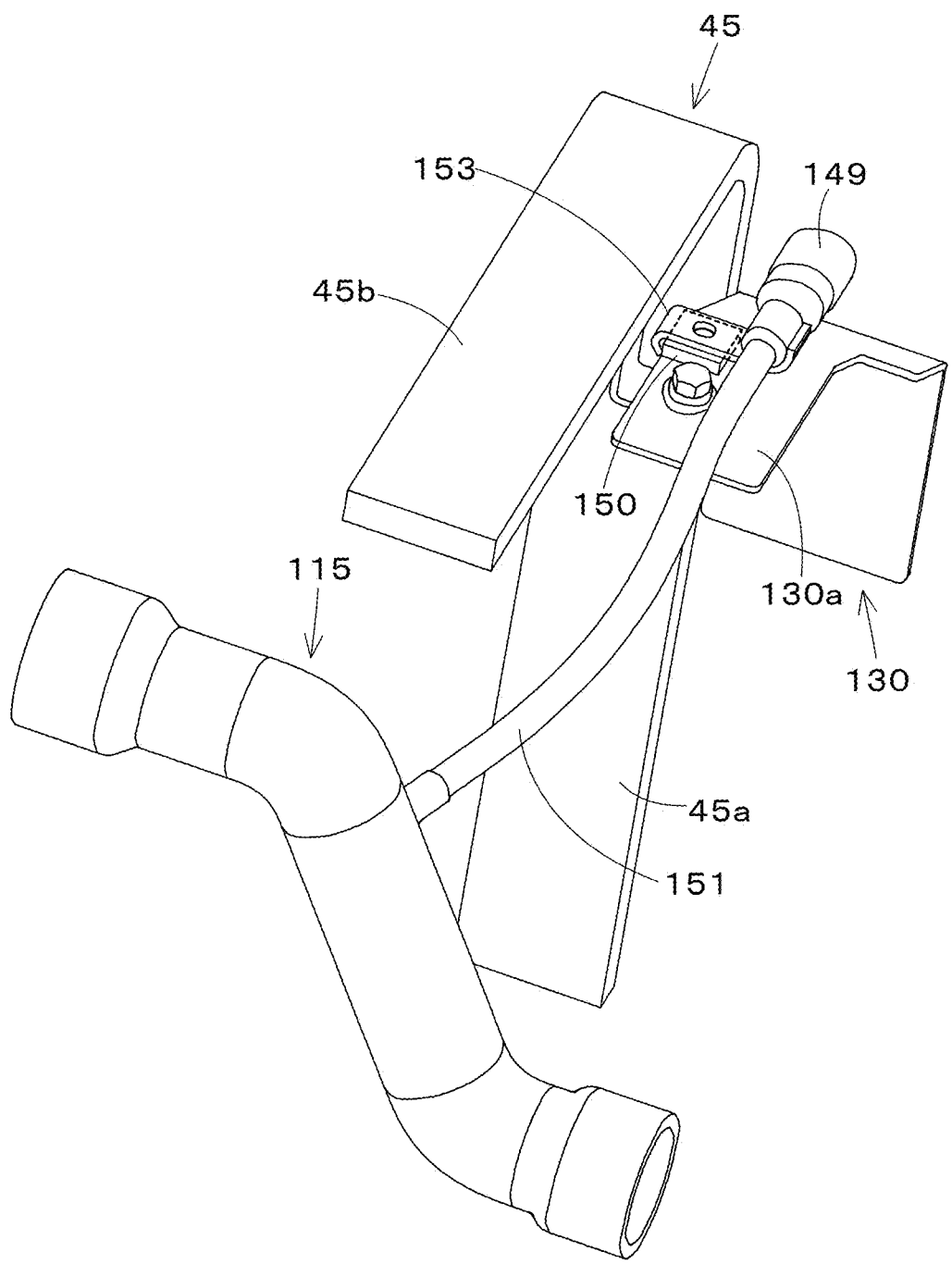
FIG. 39 is a perspective view illustrating an attached state of an indicator.

As illustrated in FIG. 39, the fan cover 129 includes an indicator mounting member 150 to which an indicator 149 is attached. The indicator 149 provides an indication on the air cleaner 118. For example, the indicator 149 indicates the amount of dust accumulated in the air cleaner 118. The indicator 149 is attached to a hose 151 connected to the duct member 115 through which cleaned air is sent from the air cleaner 118 to the prime mover 23. The indicator 149 includes a mounting member 153 to be fixed to the indicator mounting member 150 by a bolt.

The fan cover 129 (first cover 130) also serves as a bracket to which the reserve tank 147 and the indicator 149 are attached. This achieves a simplified structure. Additionally, the reserve tank 147 and the indicator 149 as well as the fan cover 129 can serve as a protector to prevent an operator from touching the cooling fan 29 accidentally. In addition, attaching the reserve tank 147 and the indicator 149 to the fan cover 129 attached to the support frame 31 can increase the strength of the above-described protector.

As illustrated in FIG. 37, a guide bar 152 is fixed to the first cover 130. The guide bar 152 protects a hose routed from the radiator 25 over the intermediate wall 130b of the first cover 130 to the reserve tank 147 so that the hose does not touch an edge of the first cover 130.

Example embodiments of the present invention provide working machines 1 as described in the following items.

(Item 1-1) A working machine 1 including a machine body 2, a prime mover 23 on the machine body 2, at least one cooling device provided at one side of the prime mover 23, a shroud 57 to guide a cooling air flow for cooling the at least one cooling device, and a partition plate 39 to separate a prime mover room 52 to house the prime mover 23 from an area 56 where the at least one cooling device is provided, wherein the partition plate 39 includes an opening 59 to allow the shroud 57 to extend therethrough and a mounting portion 58 at which the shroud 57, which extends through the opening 59, is attached to the partition plate 39.

In the working machine 1 according to item 1-1, the opening 59 is provided in the partition plate 39 which separates the prime mover room 52 from the area 56 where the at least one cooling device is provided. The shroud 57 extending through the opening 59 is attached to the partition plate 39. This achieves a reduction in space around the shroud 57.

(Item 1-2) The working machine 1 according to item 1-1, further including a base plate 15 to define a bottom portion of the machine body 2, a hood 22 to define the prime mover room 52, and a support frame 31 to support the hood 22, wherein the partition plate 39 includes a main plate portion 60 including the opening 59 and attached to the support frame 31 and a lower wall portion 61 extending horizontally from a lower edge of the main plate portion 60 and attached to the base plate 15.

In the working machine 1 according to item 1-2, the partition plate 39 can partition the space above the base plate 15 into the prime mover room 52 and the area 56 where the at least one cooling device is provided.

(Item 1-3) The working machine 1 according to item 1-2, wherein the support frame 31 includes a structure 36 provided between the prime mover 23 and the partition plate 39, the structure 36 includes a front structure portion 40, a rear structure portion 41 provided rearward of and apart from the front structure portion 40, and an upper structure portion 42 coupling an upper portion of the front structure portion 40 and an upper portion of the rear structure portion 41, and the partition plate 39 is sized to cover a space between the base plate 15 and the upper structure portion 42 and extend from the front structure portion 40 to the rear structure portion 41.

In the working machine 1 according to item 1-3, the partition plate 39 can suitably separate the prime mover room 52 from the area 56 where the at least one cooling device is provided.

(Item 1-4) The working machine 1 according to any one of items 1-1 to 1-3, wherein the opening 59 is defined to allow the shroud 57 to extend therethrough from the area where the at least one cooling device is provided to the prime mover room 52, and the mounting portion 58 is configured to allow the shroud 57, which extends through the opening 59 from the area where the at least one cooling device is provided to the prime mover room 52, to be attached to the partition plate 39 from the area where the at least one cooling device is provided.

In the working machine 1 according to item 1-4, the shroud 57 can be attached to the partition plate 39 from the area where the at least one cooling device is provided, that is, from the side opposite from the prime mover 23. This facilitates attachment of the shroud 57 to the partition plate 39.

(Item 1-5) The working machine 1 according to any one of items 1-1 to 1-4, wherein the at least one cooling device is attached, from the area where the at least one cooling device is provided, to the partition plate 39 with the shroud 57 attached to the partition plate 39.

In the working machine 1 according to item 1-5, when the at least one cooling device is attached to the partition plate 39, the at least one cooling device can be easily attached to the partition plate 39.

(Item 1-6) The working machine 1 according to any one of items 1-1 to 1-5, further including a lifting lug 89, 98 located on at least a portion of an assembly 112 obtained by attaching the shroud 57 and the at least one cooling device to the partition plate 39, the lifting lug 89, 98 being configured to be used to lift the assembly 112 as a single unit.

In the working machine 1 according to item 1-6, the assembly 112 obtained by attaching the shroud 57 and the at least one cooling device to the partition plate 39 can be easily attached to the machine body 2.

(Item 1-7) The working machine 1 according to any one of claims 1-1 to 1-6, wherein the shroud 57 includes a guard portion 57*a* to surround a cooling fan 29 to generate the cooling air flow, an intake portion 57*b* provided at a distance from the guard portion 57*a* to allow the cooling air flow to enter the shroud 57 therethrough, and an air guide portion 57*c* to guide the cooling air flow from the intake portion 57*b* to the guard portion 57*a*, and the shroud 57 is attached to the partition plate 39 such that the guard portion 57*a* and the air guide portion 57*c* are inserted through the opening 59 from an opposite side of the partition plate 39 from the prime mover 23.

The working machine 1 according to item 1-7 provides easy access to the shroud 57 from the opposite side of the partition plate 39 from the prime mover 23.

(Item 1-8) The working machine 1 according to item 1-7, wherein the mounting portion 58 is provided at a portion around the opening 59, the shroud 57 includes a mount wall portion 57*d* projecting from the intake portion 57*b* and extending along an edge of the opening 59, and the mount wall portion 57*d* is in contact with the portion around the opening 59 of the partition plate 39 on the opposite side of the partition plate 39 from the prime mover 23 and is attached to the mounting portion 58 on the opposite side.

The working machine 1 according to item 1-8 suitably reduces a space around the shroud 57.

(Item 1-9) The working machine 1 according to any one of items 1-1 to 1-8, wherein the at least one cooling device includes a plurality of cooling devices, and the plurality of cooling devices are attached to the partition plate 39.

In the working machine 1 according to item 1-9, the partition plate 39 with the shroud 57 and the plurality of cooling devices attached thereto can be mounted on the machine body 2.

(Item 1-10) The working machine 1 according to any one of items 1-1 to 1-9, further including a routed member 115 routed through the partition plate 39, wherein the partition plate 39 includes a hole 113 to allow the routed member 115 to extend therethrough and a closing structure 120 to close the hole 113 with the routed member 115 extending through the hole 113, and the closing structure 120 includes a plurality of sealing members 121A, 121B in tight contact with each other to seal the hole 113.

In the working machine 1 according to item 1-10, the hole 113 through which the routed member 115 extends can be closed suitably.

(Item 1-11) The working machine 1 according to item 1-10, wherein the plurality of sealing members 121A, 121B are in tight contact with each other in a direction along a plate surface of the partition plate 39.

The working machine 1 according to item 1-11 allows a reduction in width of the closing structure 120.

Example embodiments of the present invention further provide working machines 1 as described in the following items.

(Item 2-1) A working machine 1 including a machine body 2, a prime mover 23 on the machine body 2, a cooling fan 29 provided at one side of the prime mover 23, a fan cover 129 to cover the cooling fan 29, wherein the fan cover 129 includes a first cover 130 and a second cover 131 independent of the first cover 130 and provided lower than the first cover 130.

In the working machine 1 according to item 2-1, the fan cover 129 has a divided structure including the first cover 130 and the second cover 131. This can prevent or reduce bending of the fan cover 129 caused by vibrations.

(Item 2-3) The working machine 1 according to item 2-1, further including a first driven device (compressor 135) and a second driven device (alternator 136) provided at one of opposite sides of the prime mover 23 that is closer to the cooling fan 29 than the other, the first driven device and the second driven device being configured to be driven by power from the prime mover 23, wherein the first cover 130 is positioned to cover the first driven device 135, and the second cover 131 is positioned to cover the second driven device 136.

In the working machine 1 according to item 2-2, the first driven device 135 and the second driven device 136 can be covered individually. This can simplify the shape of the fan cover 129.

(Item 2-3) The working machine 1 according to item 2-2, further including a first driving portion (first transmission pulley 142) to receive power transmitted from the prime mover 23 to drive the first driven device 135, and a second driving portion (second transmission pulley 143) to receive power transmitted from the prime mover 23 to drive the second driven device 136, wherein the first cover 130 covers the first driving portion 142, and the second cover 131 covers the second driving portion 143.

In the working machine 1 according to item 2-3, the fan cover 129 covering the cooling fan 29 can cover the first driving portion to drive the first driven device and the second driving portion to drive the second driven device.

(Item 2-4) The working machine 1 according to item 2-3, wherein the first driving portion and the second driving portion are offset relative to each other in an up-down direction, a machine-body width direction K2, and in a front-rear direction K1.

In the working machine 1 according to item 2-4, the fan cover 129 has a divided structure including the first cover 130 and the second cover 131, and therefore, even through objects to be covered with the fan cover 129 are offset relative to each other in the up-down direction, the machine-body width direction K2, and the front-rear direction K1, the fan cover 129 can properly cover the objects.

(Item 2-5) The working machine 1 according to any one of items 2-1 to 2-4, wherein the first cover 130 and the second cover 131 each have an opening facing toward the prime mover 23.

In the working machine 1 according to item 2-5, the first driven device and the second driven device do not need to be covered as a whole, and therefore the first cover 130 and the second cover 131 can be made compact.

(Item 2-6) The working machine 1 according to any one of items 2-1 to 2-5, further including a hood 22 to define a prime mover room 52 to house the prime mover 23, and a support frame 31 to support the hood 22, wherein the first cover 130 and the second cover 131 are attached to the support frame 31.

The working machine 1 according to item 2-6 allows the fan cover 129 (the first cover 130 and the second cover 131) to be supported firmly.

(Item 2-7) The working machine 1 according to item 2-6, wherein the support frame 31 includes a leg portion 45 including a first section 45*a* located rearward of the cooling fan 29 and a second section 45*b* extending forward from an upper portion of the first section 45*a*, the first cover 130 is attached to the upper portion of the first section 45*a* and the second section 45*b*, and the second cover 131 is attached to a lower portion of the first section 45*a*.

The working machine 1 according to item 2-7 also allows the fan cover 129 (the first cover 130 and the second cover 131) to be supported firmly.

(Item 2-8) The working machine 1 according to any one of the items 2-1 to 2-7, further including a hood 22 to define a prime mover room 52 to house the prime mover 23, a support frame 31 to support the hood 22, a shroud 57 to guide cooling air generated by the cooling fan 29, and a plate member (partition plate 39) to attach the shroud 57 thereto, wherein the fan cover 129 is attached to the support frame 31, and the partition plate 39 with the shroud 57 attached thereto is attached to the support frame 31 such that the shroud 57 is inserted into the support frame 31 from an opposite side of the support frame 31 from the fan cover 129.

The working machine 1 according to item 2-8 allows the partition plate 39 and the shroud 57 to be attached suitably.

(Item 2-9) The working machine 1 according to any one of items 2-1 to 2-8, further including a reserve tank 147 to store liquid, wherein the fan cover 129 includes a tank mounting member 148 to attach the reserve tank 147 thereto.

The working machine 1 according to item 2-9 allows the fan cover 129 to function as a bracket to which the reserve tank 147 is attached. This achieves a simplified structure of the working machine 1.

(Item 2-10) The working machine 1 according to any one of items 2-1 to 2-9, further including an air cleaner 118 to clean air supplied to the prime mover 23, and an indicator 149 to provide an indication relating to the air cleaner 118, wherein the fan cover 129 includes an indicator mounting member 150 to attach the indicator 149 thereto.

The working machine 1 according to item 2-10 allows the fan cover 129 to function as a bracket to which the indicator 149 is attached. This achieves a simplified structure of the working machine 1.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A working machine comprising:
    a machine body;
    a prime mover on the machine body;
    at least one cooling device provided at one side of the prime mover;
    a shroud to guide a cooling air flow for cooling the at least one cooling device; and
    a partition plate to separate a prime mover room to house the prime mover from an area where the at least one cooling device is provided; wherein
    the partition plate includes an opening to allow the shroud to extend therethrough and a mounting portion at which the shroud, which extends through the opening, is attached to the partition plate;
    the opening is defined to allow the shroud to extend therethrough from the area where the at least one cooling device is provided to the prime mover room; and
    the mounting portion is configured to allow the shroud, which extends through the opening from the area where the at least one cooling device is provided to the prime mover room, to be attached to the partition plate from the area where the at least one cooling device is provided.

2. The working machine according to claim 1, wherein the at least one cooling device is attached, from the area where the at least one cooling device is provided, to the partition plate with the shroud attached to the partition plate.

3. The working machine according to claim 2, further comprising:
    a lifting lug located on at least a portion of an assembly obtained by attaching the shroud and the at least one cooling device to the partition plate, the lifting lug being configured to be used to lift the assembly as a single unit.

4. The working machine according to claim 1, wherein the at least one cooling device includes a plurality of cooling devices; and the plurality of cooling devices are attached to the partition plate.

5. The working machine according to claim 1, further comprising:
a routed member routed through the partition plate; wherein
the partition plate includes a hole to allow the routed member to extend therethrough and a closing structure to close the hole with the routed member extending through the hole, and
the closing structure includes a plurality of sealing members in tight contact with each other to seal the hole.

6. The working machine according to claim 5, wherein the plurality of sealing members are in tight contact with each other in a direction along a plate surface of the partition plate.

7. The working machine according to claim 1, further comprising:
a cooling fan provided at one side of the prime mover to generate the cooling air flow; and
a fan cover to cover the cooling fan, wherein
the fan cover includes a first cover and a second cover independent of the first cover and provided lower than the first cover.

8. The working machine according to claim 7, further comprising:
a first driven device and a second driven device provided at one of opposite sides of the prime mover that is closer to the cooling fan than the other, the first driven device and the second driven device being configured to be driven by power from the prime mover; wherein
the first cover is positioned to cover the first driven device; and
the second cover is positioned to cover the second driven device.

9. The working machine according to claim 8, further comprising:
a first driving portion to receive power transmitted from the prime mover to drive the first driven device; and
a second driving portion to receive power transmitted from the prime mover to drive the second driven device; wherein
the first cover covers the first driving portion; and
the second cover covers the second driving portion.

10. The working machine according to claim 9, wherein the first driving portion and the second driving portion are offset relative to each other in an up-down direction, a machine-body width direction, and in a front-rear direction.

11. The working machine according to claim 7, wherein the first cover and the second cover each have an opening facing toward the prime mover.

12. The working machine according to claim 7, further comprising:
a hood to define the prime mover room; and
a support frame to support the hood; wherein
the first cover and the second cover are attached to the support frame.

13. The working machine according to claim 12, wherein
the support frame includes a leg portion including a first section located rearward of the cooling fan and a second section extending forward from an upper portion of the first section;
the first cover is attached to the upper portion of the first section and the second section; and
the second cover is attached to a lower portion of the first section.

14. The working machine according to claim 7, further comprising a reserve tank to store liquid; wherein
the fan cover includes a tank mounting member to attach the reserve tank thereto.

15. The working machine according to claim 7, further comprising:
an air cleaner to clean air supplied to the prime mover; and
an indicator to provide an indication relating to the air cleaner; wherein
the fan cover includes an indicator mounting member to attach the indicator thereto.

16. A working machine comprising:
a machine body;
a prime mover on the machine body;
at least one cooling device provided at one side of the prime mover;
a shroud to guide a cooling air flow for cooling the at least one cooling device;
a partition plate to separate a prime mover room to house the prime mover from an area where the at least one cooling device is provided;
a base plate to define a bottom portion of the machine body;
a hood to define the prime mover room; and
a support frame to support the hood; wherein
the partition plate includes an opening to allow the shroud to extend therethrough and a mounting portion at which the shroud, which extends through the opening, is attached to the partition plate; and
the partition plate further includes a main plate portion including the opening and attached to the support frame and a lower wall portion extending horizontally from a lower edge of the main plate portion and attached to the base plate.

17. The working machine according to claim 16, wherein
the support frame includes a structure provided between the prime mover and the partition plate;
the structure includes a front structure portion, a rear structure portion provided rearward of and apart from the front structure portion, and an upper structure portion coupling an upper portion of the front structure portion and an upper portion of the rear structure portion; and
the partition plate is sized to cover a space between the base plate and the upper structure portion and extend from the front structure portion to the rear structure portion.

18. A working machine comprising:
a machine body;
a prime mover on the machine body;
at least one cooling device provided at one side of the prime mover;
a shroud to guide a cooling air flow for cooling the at least one cooling device; and
a partition plate to separate a prime mover room to house the prime mover from an area where the at least one cooling device is provided; wherein
the partition plate includes an opening to allow the shroud to extend therethrough and a mounting portion at which the shroud, which extends through the opening, is attached to the partition plate;
the shroud includes a guard portion to surround a cooling fan to generate the cooling air flow, an intake portion provided at a distance from the guard portion to allow the cooling air flow to enter the shroud therethrough, and an air guide portion to guide the cooling air flow from the intake portion to the guard portion; and the shroud is attached to the partition plate such that the guard portion and the air guide portion are inserted through the opening from an opposite side of the partition plate from the prime mover.

19. The working machine according to claim 18, wherein the mounting portion is provided at a portion around the opening;

the shroud includes a mount wall portion projecting from the intake portion and extending along an edge of the opening; and the mount wall portion is in contact with the portion around the opening of the partition plate on the opposite side of the partition plate from the prime mover and is attached to the mounting portion on the opposite side.

* * * * *